(12) United States Patent
Kim et al.

(10) Patent No.: US 12,504,872 B2
(45) Date of Patent: Dec. 23, 2025

(54) METHOD FOR CONTROLLING FLEXIBLE DISPLAY AND ELECTRONIC DEVICE THEREOF

(71) Applicant: Samsung Electronics Co., Ltd., Gyeonggi-do (KR)

(72) Inventors: Ilseub Kim, Gyeonggi-do (KR); Bomi Lee, Gyeonggi-do (KR); Pilwon Seo, Gyeonggi-do (KR); Jiyoung Kim, Gyeonggi-do (KR); Jiwoo Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/093,125

(22) Filed: Jan. 4, 2023

(65) Prior Publication Data

US 2023/0145871 A1    May 11, 2023

Related U.S. Application Data

(63) Continuation of application No. PCT/KR2021/016021, filed on Nov. 5, 2021.

(30) Foreign Application Priority Data

Nov. 6, 2020    (KR) .......................... 10-2020-0148075

(51) Int. Cl.
*G06F 1/16*    (2006.01)
*G06F 3/04847*    (2022.01)
(Continued)

(52) U.S. Cl.
CPC ........ *G06F 3/04847* (2013.01); *G06F 1/1624* (2013.01); *G06F 1/1626* (2013.01);
(Continued)

(58) Field of Classification Search
CPC .. G06F 3/04847; G06F 1/1624; G06F 1/1626; G06F 1/1652; G06F 3/04886; G06F 21/32; G06F 2203/04803; G06V 40/172
See application file for complete search history.

(56) References Cited

U.S. PATENT DOCUMENTS 7,089,044 B2    8/2006    Ohta
8,064,962 B2    11/2011    Wilcox et al.
(Continued)

FOREIGN PATENT DOCUMENTS

| CN | 109597551 | 4/2019 |
| CN | 111061406 | 4/2020 |

(Continued)

OTHER PUBLICATIONS

PCT/ISA/210 Search Report issued on PCT/KR2021/016021, Feb. 22, 2022, pp. 5.

(Continued)

*Primary Examiner* — Irete F Ehichioya
*Assistant Examiner* — Samuel Shen
(74) *Attorney, Agent, or Firm* — The Farrell Law Firm, P.C.

(57) ABSTRACT

An electronic device is provided, which can include a flexible display, a rolling actuator for expanding or reducing the flexible display, a wireless communication circuit, and a processor. The processor can receive, via the wireless communication circuit, a message from an external device, and in response to receiving the message, drive the first rolling actuator, expand the flexible display by a first length in a first direction, and display a first UI including a plurality of content, in a first region of the flexible display expanded by the first length.

12 Claims, 18 Drawing Sheets

(51) Int. Cl.
   *G06F 3/04886* (2022.01)
   *G06F 21/32* (2013.01)
   *G06V 40/16* (2022.01)

(52) U.S. Cl.
   CPC ........ *G06F 1/1652* (2013.01); *G06F 3/04886* (2013.01); *G06F 21/32* (2013.01); *G06V 40/172* (2022.01); *G06F 2203/04803* (2013.01)

(56) References Cited

U.S. PATENT DOCUMENTS

| | | | | |
|---|---|---|---|---|
| 8,411,909 | B1* | 4/2013 | Zhao | G06V 40/40 382/116 |
| 8,576,555 | B2* | 11/2013 | Misawa | G02F 1/133308 345/157 |
| 9,589,529 | B2 | 3/2017 | Kim | |
| 10,379,720 | B2 | 8/2019 | Ryu et al. | |
| 10,963,016 | B1* | 3/2021 | Oh | G06F 3/0416 |
| 11,042,192 | B2 | 6/2021 | Choi et al. | |
| 11,057,514 | B1* | 7/2021 | Noh | G06F 1/1643 |
| 11,252,826 | B2 | 2/2022 | Park et al. | |
| 2012/0306910 | A1 | 12/2012 | Kim et al. | |
| 2013/0234951 | A1* | 9/2013 | Kim | G06F 3/0481 345/173 |
| 2013/0328917 | A1 | 12/2013 | Zambetti et al. | |
| 2015/0278529 | A1* | 10/2015 | Cho | G06F 1/1677 345/668 |
| 2016/0062600 | A1* | 3/2016 | Kim | G06F 3/0488 715/765 |
| 2016/0112667 | A1* | 4/2016 | Park | H04N 21/4858 348/739 |
| 2016/0191429 | A1 | 6/2016 | Lee et al. | |
| 2017/0011714 | A1* | 1/2017 | Eim | G06F 1/1677 |
| 2017/0147189 | A1* | 5/2017 | Ryu | G06F 3/04886 |
| 2018/0112454 | A1* | 4/2018 | Preus | E05F 15/74 |
| 2018/0348881 | A1* | 12/2018 | Chung | H04W 88/02 |
| 2019/0278335 | A1* | 9/2019 | Yeh | G09F 9/301 |
| 2019/0369755 | A1* | 12/2019 | Roper | G06F 3/0481 |
| 2021/0337049 | A1* | 10/2021 | Noh | H04M 1/0237 |
| 2021/0405857 | A1 | 12/2021 | Kim et al. | |
| 2023/0076158 | A1* | 3/2023 | Li | H04M 1/0268 |

FOREIGN PATENT DOCUMENTS

| | | |
|---|---|---|
| CN | 111104086 | 5/2020 |
| JP | 2002-281116 | 9/2002 |
| KR | 1020120134228 | 12/2012 |
| KR | 10-2016-0142172 | 12/2016 |
| KR | 10-1910162 | 5/2017 |
| KR | 10-2017-0060519 | 6/2017 |
| KR | 10-2019-0101184 | 8/2019 |
| KR | 10-2019-0105858 | 9/2019 |
| KR | 10-2091602 | 3/2020 |
| KR | 10-2022-0000270 | 1/2022 |

OTHER PUBLICATIONS

PCT/ISA/237 Written Opinion issued on PCT/KR2021/016021 Feb. 22, 2022, pp. 4.
European Search Report dated Feb. 13, 2024 issued in counterpart application No. 21889611.6-1224, 10 pages.
Korean Office Action dated May 2, 2025 issued in counterpart application No. 10-2020-0148075, 15 pages.

* cited by examiner

METHOD FOR CONTROLLING FLEXIBLE DISPLAY AND ELECTRONIC DEVICE THEREOF

CROSS-REFERENCE TO RELATED APPLICATIONS

This application is a Bypass Continuation Application of International Application No. PCT/KR2021/016021, which was filed on Nov. 5, 2021, and is based on and claims priority under 35 U.S.C. § 119 to Korean Patent Application No. 10-2020-0148075, which was filed in the Korean Intellectual Property Office on Nov. 6, 2020, the entire disclosure of each of which is incorporated herein by reference herein in its entirety.

BACKGROUND

1. Field

The present disclosure relates generally to a method for controlling a flexible display and an electronic device thereof.

2. Description of Related Art

A portable tablet device may include a relatively large screen in order to provide increased interaction and information through a display. Additionally, it is common for a portable tablet device to be used in connection with a cover, in order to protect the display from external shocks, scratches, etc.

In addition, in response to the rapid development of electronic devices, peripheral devices of the electronic devices are also developing. Some of examples of the peripheral devices include input/output devices, such as electronic pens and wireless earphones. A user can input information to the touch screen of the electronic device by using the electronic pen.

As the use of an electronic device with a cover has increased, a need has emerged for ways to provide interaction to a user while the cover is closed.

For example, when the cover is connected and closed, this may a limit information being provided through the display. While the electronic device may still be able to provide simple content through an exposed region of the display in response to a user opening the cover, when a book cover remains closed the display cannot be seen. For example, when the electronic device receives a message while the cover is closed, it can be difficult for the electronic device to provide a message notification through the display, which can be seen by the user. Also, the electronic device may not be able to interact with a peripheral device (e.g., an electronic pen or a wireless earphone) while the cover is closed.

SUMMARY

Accordingly, an aspect of the disclosure is to provide an electronic device and a control method of the electronic device, for expanding a flexible display in response to a predetermined event while a book cover coupled with the electronic device is closed, and displaying a user interface (UI) on one surface of the expanded flexible display.

In accordance with an aspect of the disclosure, an electronic device is provided, which includes a flexible display, a rolling actuator for expanding or reducing the flexible display, a wireless communication circuit, and a processor connected to the flexible display, the rolling actuator, and the wireless communication circuit. The processor receives, via the wireless communication circuit, a message from an external device, and in response to receiving the message, drives the rolling actuator, expands the flexible display by a first length in a first direction, and displays a first UI presenting a plurality of content, in a first region of the flexible display expanded by the first length. The plurality of content includes a first content associated with the message and a second content distinct from the first content.

In accordance with another aspect of the disclosure, a method is provided for operating an electronic device, which includes receiving a message from an external device by using a wireless communication circuit, and in response to receiving the message, driving a first rolling actuator, expanding a flexible display by a first length in a first direction, and displaying a first UI including a plurality of content, in a first region of the flexible display expanded by the first length.

In accordance with another aspect of the disclosure, an electronic device is provided, which includes a flexible display, a rolling actuator for expanding or reducing the flexible display, and a processor connected to the flexible display and the rolling actuator. The processor acquires an expansion event for the flexible display, and in response to the expansion event, drives the at least one rolling actuator, expands the flexible display by a first length in a first direction, and displays a first UI presenting a plurality of contents, in a first region of the flexible display expanded by the first length.

According to an embodiment, an electronic device can expand a flexible display while a cover is closed.

According to another embodiment, the electronic device can provide a notification interface through an expanded region of the flexible display in a state in which the cover is closed. The electronic device can automatically expose a notification to the outside of the cover according to an expansion event.

According to another embodiment, the electronic device can recognize a user's intention and expand the flexible display, thereby increasing a user's usability.

In addition, various effects directly or indirectly identified through the present disclosure can be provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to the accompanying drawings. However, these descriptions are not intended to limit the disclosure to any specific embodiments, and it should be understood that various modifications, equivalents, and/or alternatives of the embodiments of the disclosure are included.

Figure 1A:
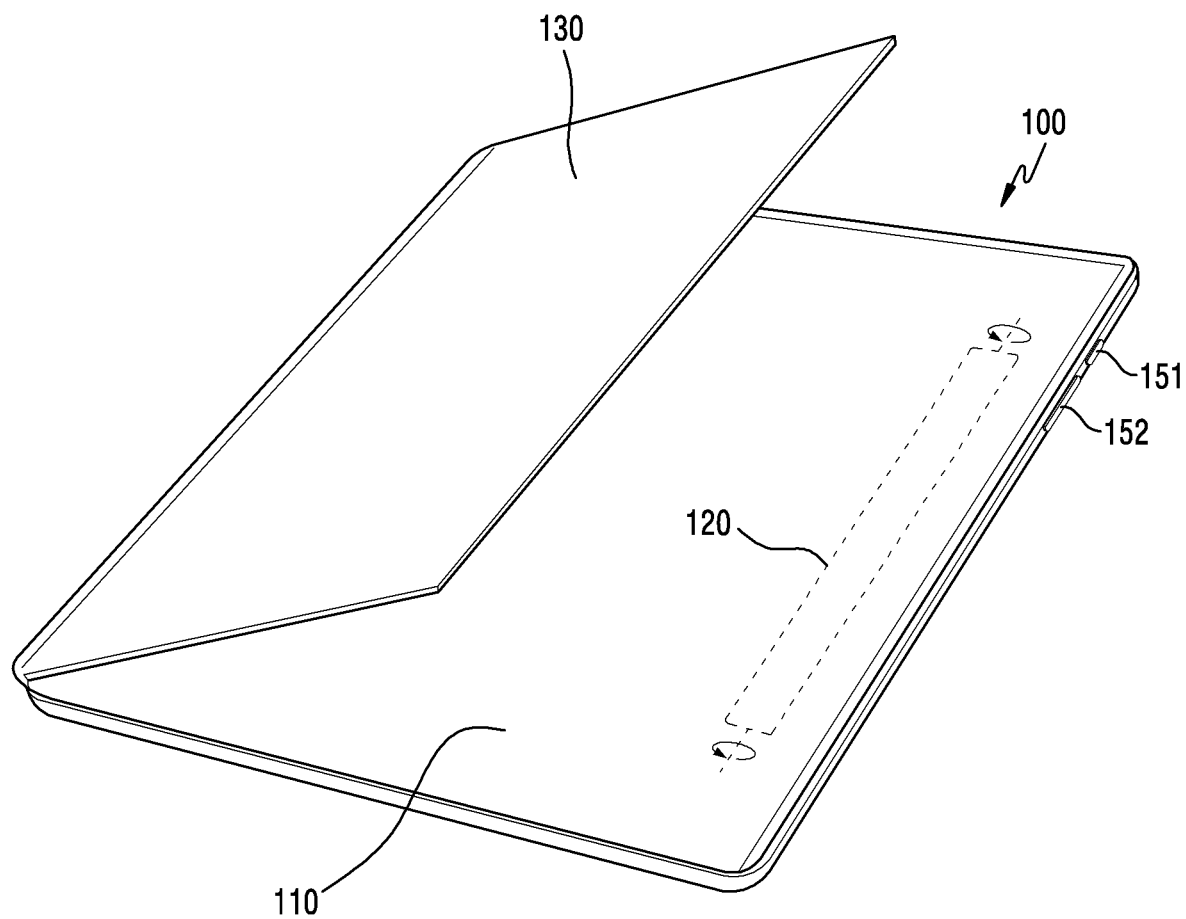
FIG. 1A illustrates an electronic device according to an embodiment.

FIG. 1A illustrates an electronic device according to an embodiment.

Referring to FIG. 1A, an electronic device 100 includes a flexible display 110, a first rolling actuator 120, a cover 130, a first function key 151, and a second function key 152.

The flexible display 110 can retract and expand in a horizontal direction or a vertical direction of the electronic device 100 by adopting a rolling structure. Herein, expanding the flexible display 110 refers to a region of the flexible display 110 disposed on a front surface of the electronic device 100 being expanded.

The flexible display 110 and/or a bezel region surrounding at least some edges of the flexible display 110 can be disposed on a front surface of the electronic device 100. In FIG. 1A, the flexible display 110 includes a flat area, a curved area extending from the flat area toward a side surface of the electronic device 100, and a flat area extending from the curved area toward a rear surface of the electronic device 110.

The flexible display 110 includes the first rolling actuator 120.

The first rolling actuator 120 can be disposed adjacent to one side surface of the electronic device 100. For example, the first rolling actuator 120 can be disposed in the vicinity of a side surface that is not covered with the cover 130 among the longest side surface.

The cover 130 can be attached to the electronic device 100 and cover the front surface of the flexible display 110. The cover 130 can be attached to the electronic device 100 using a magnet disposed on the rear surface of the electronic device 100. The cover 130 can surround at least a least a portion of a side surface of the electronic device 100. The cover 130 can be referred to as a book cover.

Alternatively, the cover 130 can be implemented in a different form than illustrated in the drawings. For example, the cover 130 can be divided into two regions, wherein a first cover region of the cover 130 can be attached to the rear surface of the electronic device 100 using a magnet disposed on the rear surface of the electronic device 100, and/or a second cover region of the cover 130 can be attached to one side surface of the electronic device 100 using a magnet disposed on the one side surface of the electronic device 100. The second cover region may be electrically connected to a pogo connector included in the one side surface of the electronic device 100, and can include a keyboard and a touch pad.

At least one physical key can be disposed on a side portion of the electronic device 100. In the example of FIG. 1A, a first function key 151 for turning on/off the flexible display 110 or turning on/off the power of the electronic device 100 is disposed on the right edge with respect to the front surface of the electronic device 100. A second function key 152 for controlling a volume or screen brightness, etc., of the electronic device 100 is disposed on the left edge with respect to the front surface of the electronic device 100.

Additionally or alternatively, a physical button or touch button mapped to a specific function can also be disposed on the front surface or rear surface of the electronic device 100.

Figure 1B:
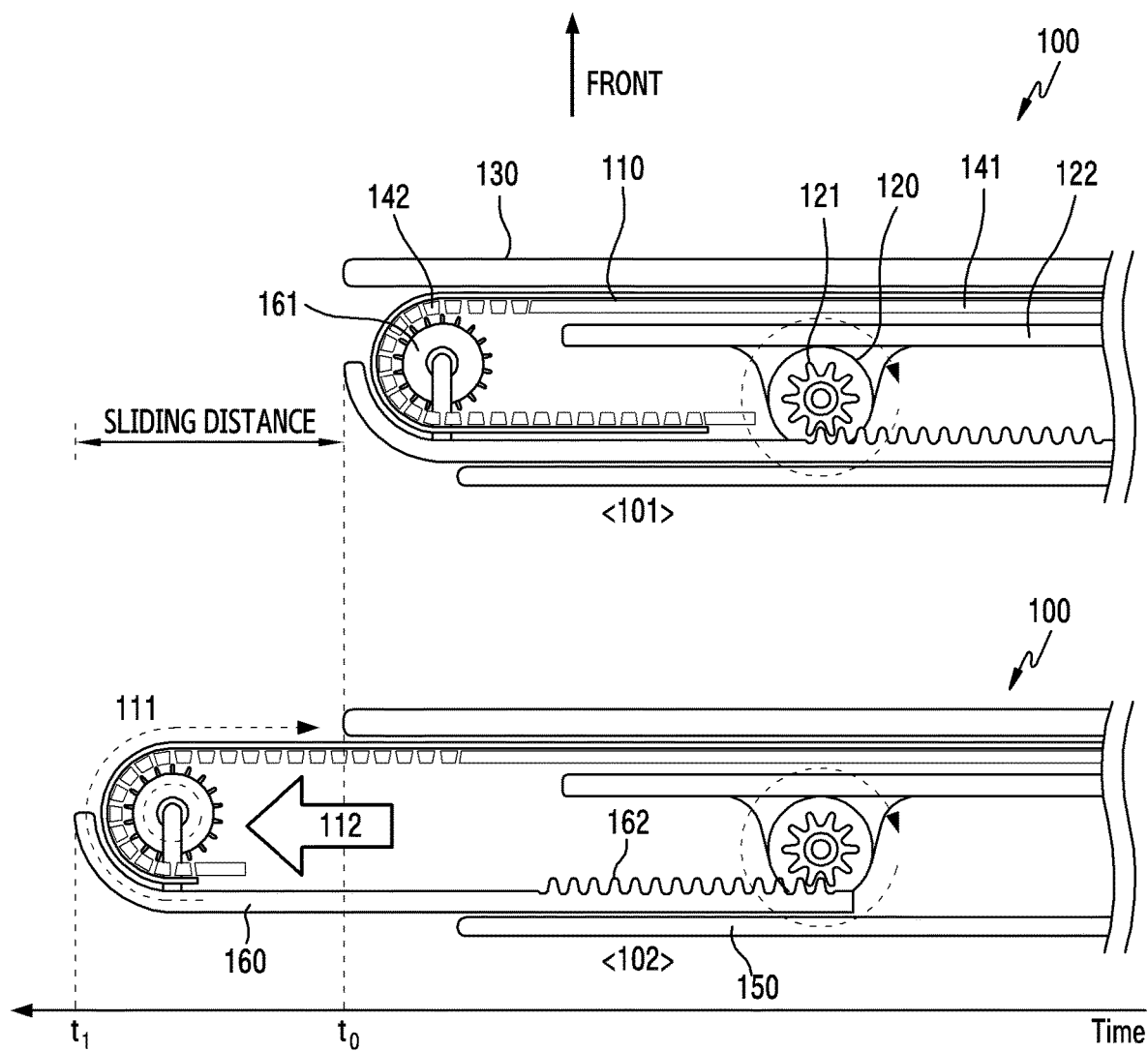
FIG. 1B illustrates a cross-sectional view of an electronic device according to an embodiment.

FIG. 1B illustrates a cross-sectional view of an electronic device 100 according to an embodiment. Specifically, FIG. 1B illustrates a cross-sectional view of the electronic device 100 in a state 101, in which the flexible display 110 is retracted (not expanded) and a cross-sectional view of the electronic device 100 in a state 102, in which the flexible display 110 is expanded.

Referring to FIG. 1B, the electronic device 100 includes a first housing 150, a second housing 160, a first rolling actuator 120, a first plate 141, a second plate 142, a flexible display 110, and a cover 130. The second housing 160 can be referred to as a sliding housing, and the second plate 142 can be referred to as a multi-plate.

The first plate 141 can be connected to the second plate (multi-plate) 142. The multi-plate 142 can include a plurality of plates, and a plurality of grooves can be formed between the plurality of plates. The plurality of plates can be implemented in a bent shape connected to a hinge structure.

The plurality of grooves of the multi-plate 142 can be engaged with a plurality of protrusions of a roller 161. The roller 161 can include a gear structure having a protrusion.

The roller 161 can rotate while being engaged with the multi-plate 142 through the protrusions included in the roller 161.

The second plate 142 can include a plurality of openings to secure flexibility for bending. The plurality of openings can be implemented in various shapes. For example, the plurality of openings can be implemented as a single hole opening in a circular shape or a long hole opening in a rod shape.

The second plate 142 can be engaged with the plurality of protrusions of the roller 161 through the plurality of openings.

The second plate 142 can have a different thickness for each portion of the second plate 142, to secure flexibility for bending. For example, the second plate 142 can be bent through a plurality of thin portions, and the plurality of thin portions can serve as grooves and engage with the plurality of protrusions of the roller 161.

The flexible display 110 can include an organic light-emitting diode (OLED) layer for displaying a screen and a transparent layer (e.g., ultra-thin glass) for protecting the OLED layer. The multi-plate 142 can be disposed in a direction below the OLED layer of the flexible display 110. Herein, the bottom direction of the flexible display 110 may refer to a rear direction of the flexible display 110 when the electronic device 100 is viewed.

The electronic device 100 can include a plurality of rolling actuators capable of selectively controlling an expansion direction of the flexible display 110. The plurality of rolling actuators can include the first rolling actuator 120, a second rolling actuator, and/or a third rolling actuator.

The first rolling actuator 120 can be connected to at least a partial region of a first frame 122 (e.g., a front frame). The first rolling actuator 120 can be fixedly coupled to at least a portion of the first frame 122.

The first rolling actuator 120 can be implemented in the same form as a rod-type gear motor. For example, the first rolling actuator 120 can include a rotation gear 121 forming a rotation axis.

The rotation gear 121 can include a plurality of protrusions. When the first rolling actuator 120 is a long rod-type gear motor having a first width, a plurality of rotation gears 121 can be disposed at both ends of the motor.

A sliding rail 162 can be implemented as a plurality of rails corresponding to positions of the plurality of rotation gears 121. When the first rolling actuator 120 is a short rod-type gear motor having a second width that is narrower than the first width, the first rolling actuator 120 may include a plurality of rolling actuators.

The sliding housing 160 can cover a portion (e.g., the back and/or side) of the flexible display 110 to protect the flexible display 110 from external shocks and scratches.

The sliding housing 160 can include the sliding rail 162 in one region.

The sliding rail 162 can be engaged with the rotation gear 121, and can convert a rotational motion of the rotation gear 121 into a straight-line motion of the sliding housing 160. For example, the sliding housing 160 can protrude from the inside of the first housing 150 to the outside through the straight-line motion in a first direction 112.

The sliding housing 160 includes the roller 161.

The roller 161 can be connected to at least a partial region of the sliding housing 160. For example, the roller 161 can include a shaft forming a rotation axis, and can be coupled to and fixed to at least a portion of the sliding housing 160 through the shaft.

The roller 161 can be implemented in the form of a cylindrical rod. The roller 161 can be engaged with the multi-plate 142. The multi-plate 142 can be implemented in a form in which a plurality of plates are combined. The plurality of plates can be disposed at a predetermined interval at the lower end of the flexible display 110.

In state 102, in response to an expansion event of the flexible display 110, the first rolling actuator 120 can operate by receiving a voltage.

The first rolling actuator 120 can control the sliding housing 160 to linearly move forward and backward by rotating the rotation gear 121. The first rolling actuator 120 can control to rotate the rotation gear 121 in a first rotation direction (e.g., a clockwise direction based on the drawing) and linearly move the sliding housing 160 in the first linear direction 112.

In response to the straight-line motion of the sliding housing 160, the roller 161 fixed to one region of the sliding housing 160 can rotate. When the sliding housing 160 moves in the first linear direction 112, the roller 161 engaged with the multi-plate 142 can rotate in the first rotation direction (e.g., a clockwise direction based on the drawing).

In response to the rotational movement of the roller 161, the multi-plate 142 engaged with the roller 161 can be rolled-up or rolled-down. The roller 161 can be rotated in the first rotation direction (e.g., a clockwise direction based on the drawing), and the multi-plate 142 can be spread while being rolled-up in the first rotation direction 111. The roller 161 can also be rotated in a second rotation direction (e.g., a counterclockwise direction based on the drawing), and the multi-plate 142 can be wound while being rolled-down in the second rotation direction.

The flexible display 110 attached to an upper end of the multi-plate 142 can be expanded while protruding when the multi-plate 142 is rolled-out. When the multi-plate 142 is rolled in, the flexible display 110 can be reduced while being inserted into the electronic device 100.

The description of the first rolling actuator 120 above can be equally and/or similarly applied to the second rolling actuator and the third rolling actuator.

Figure 2:
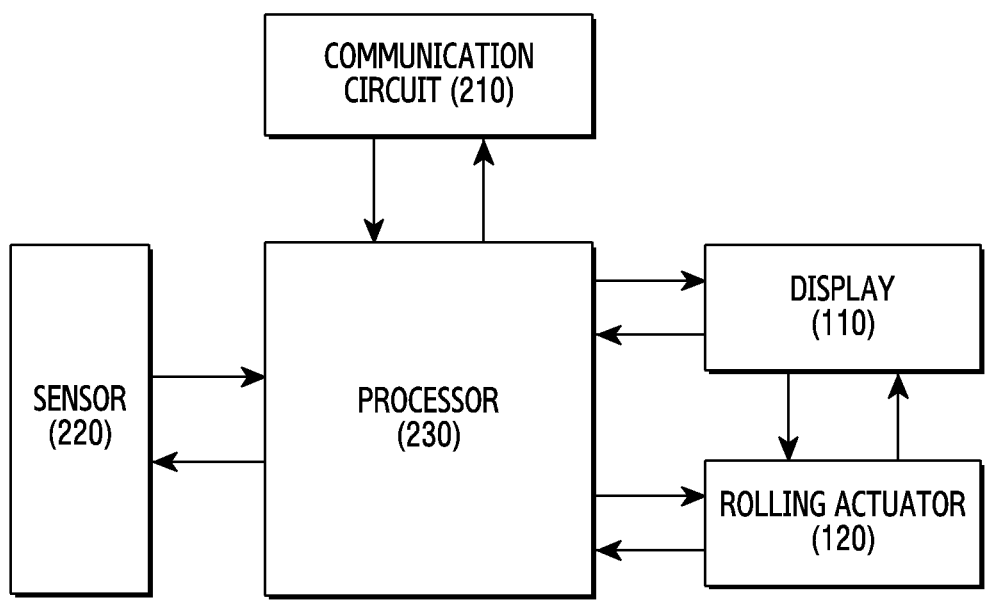
FIG. 2 illustrates an electronic device according to an embodiment.

FIG. 2 illustrates an electronic device according to an embodiment.

Referring to FIG. 2, the electronic device includes a communication circuit 210, a sensor 220, a processor 230, the flexible display 110, and the rolling actuator 120.

The communication circuit 210 may be a circuit for wireless communication.

As described above with reference to FIGS. 1A and 1B, the electronic device can expand the flexible display 110, and use a hardware and/or software module in order to support a function for displaying a UI on the expanded flexible display 110.

The communication circuit 210 can acquire a communication signal from an external device and/or an external server. The communication circuit 210 can present data about the acquired communication signal to the processor 230. The communication signal acquired from the external device and/or the external server may include various signals such as message reception, call reception, and Internet connection signal reception.

The sensor 220 may include at least one sensor, e.g., a sensor for measuring an expanded length of the flexible display 110.

A determination of the expanded length through the sensor for measuring the expanded length can be performed while determining the expanded length of the flexible display 110 based on the number of rotations of the rolling actuator 120.

Accordingly, the processor 230 can check whether the rolling actuator 120 works and whether an expansion operation of the flexible display 110 succeeds.

As another example, the sensor 220 can include an acceleration sensor, gyro sensor, and/or geomagnetic sensor, for determining a mounting state of the electronic device, and/or at least one proximity sensor for obtaining an external obstacle within the vicinity of the electronic device.

A proximity sensor can include an optical sensor, an ultrasonic sensor, and a capacitive sensor.

As another example, the sensor 220 can include a fingerprint sensor for recognizing a user's fingerprint and an infrared (IR) sensor for iris authentication.

The flexible display 110 can display a UI based on the control of the processor 230.

Based on a communication signal acquired from the communication circuit 210, the flexible display 110 can display an interface related to the communication signal. For example, when the electronic device receives a message, the flexible display 110 can display content related to the message in a specific region.

The flexible display 110 can acquire a user's input (e.g., a touch input and/or a gesture input) and transmit the user's input to the processor 230. When the processor 230 acquires a user's drawing input, e.g., through an interface related to a drawing board, the processor 230 can display an output corresponding to the drawing input through the flexible display 110.

The first rolling actuator 120 can be operatively connected to the flexible display 110 and deform a shape of the flexible display 110. The first rolling actuator 120 can expand an area when viewed from the front of the electronic device, by unfolding a rolled portion of the flexible display 110. The first rolling actuator 120 can reduce the area when viewed from the front of the electronic device, by rolling a portion of the flexible display 110.

The processor 230 can acquire data from the communication circuit 210 and the sensor 220. The processor 230 can control the rolling actuator 120, based on the data acquired from the communication circuit 210 and/or the sensor 220. The processor 230 can expand or reduce the flexible display 110 by controlling the rotation operation of the rolling actuator 120.

The processor 230 can check an expanded state of the flexible display 110. The processor 230 can determine a rotational state of the rotation gear 121 included in the first rolling actuator 120 and check to what extent the flexible display 110 is expanded.

The processor 230 can check to what extent the flexible display 110 is expanded, based on at least one of the number of rotations of the rotation gear 121, a magnitude of a voltage which is applied to the first rolling actuator 120 to rotate the rotation gear 121, or/and an ON duration of the first rolling actuator 120.

The processor 230 can determine whether to expand and/or reduce the flexible display 110, based on the checked expansion state of the flexible display 110. For example, when the processor 230 confirms that the flexible display 110 is in a fully expanded state, the processor 230 can display a reduction indicator on the flexible display 110, and can reduce the flexible display 110 based on a user input to the reduction indicator.

The description of the first rolling actuator 120 can be equally applied to the second rolling actuator and/or the third rolling actuator as will be described below.

Figure 3:
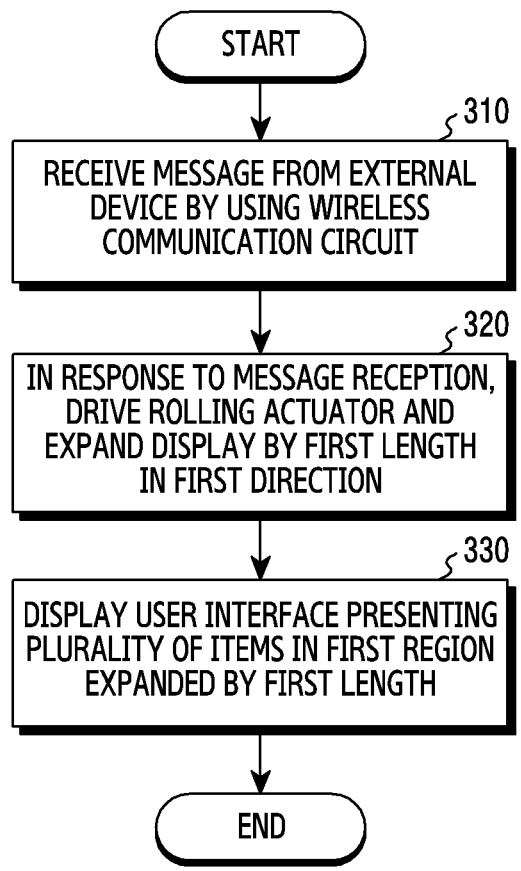
FIG. 3 is a flowchart illustrating a process of expanding a flexible display in response to a message reception in an electronic device according to an embodiment.

FIG. 3 is a flowchart illustrating a process of expanding a flexible display in response to receiving a message in an electronic device according to an embodiment.

In step 310, the electronic device, e.g., a processor therein, receives a message from an external device by using a wireless communication circuit. For example, receiving the message can include receiving an email.

When receiving the message while the cover is opened, the processor can present a notification related to message reception (e.g., a ring tone notification and/or a voice notification) or display an interface representing message notifications in a region of the flexible display.

However, when receiving the message while the cover is closed, the processor drives a first rolling actuator and expands the flexible display in a first direction by a first length. The first direction can be understood as a first side direction of the electronic device.

A first side surface of the electronic device can be one of four side surfaces having a longer length when the electronic device is viewed from the front.

The first length can be between a length when the flexible display is not expanded and a length when the flexible display is fully expanded, e.g., a half expansion. For example, when the full extension of the flexible display is about 10 cm, the first length can be about 5 cm. The first length can be adjusted by a user's setting. However, the length and the first length of the expanded and protruded flexible display are not limited to about 10 cm and about 5 cm. For example, the first length can be greater than about 5 cm or less than about 5 cm.

The processor can drive a second rolling actuator and/or a third rolling actuator, in response to receiving the message while the cover of the electronic device is closed. That is, the processor can drive the second rolling actuator and expand the flexible display by the first length in a second direction. The second direction can be understood as a second side direction of the electronic device 100.

The processor can drive the third rolling actuator and expand the flexible display by the first length in a third direction opposite to the second direction.

A second side surface of the electronic device can be one of the four side surfaces having a shorter length when the electronic device is viewed from the front.

In step 330, the processor displays a UI presenting various content, in a first region of the flexible display expanded by the first length.

The processor can determine the disposition of a notification interface, based on the expansion direction of the flexible display. For example, when the flexible display expands in the first direction, the content included in the UI can be displayed in vertical arrangement. However, when the flexible display is expanded in the second direction, content included in the UI can be displayed in horizontal arrangement.

Herein, the notification interface can be understood as a first UI or a second UI.

The processor can determine the size of the notification interface, based on the expanded length of the flexible display corresponding to a rotation operation of the rolling actuator. For example, the processor can expand the flexible display by the first length and display the first UI at a first size. In addition, the processor can expand the flexible display by a second length and display the second UI at a second size larger than the first size.

When the flexible display is expanded by about 3 cm, the processor can display the first UI at the first size and display the content included in the first UI at a size corresponding to the first size.

When the flexible display is expanded by about 6 cm, the processor can display the second UI at the second size, and enlarge and display the content included in the second UI at a size corresponding to the second size.

Figure 4:
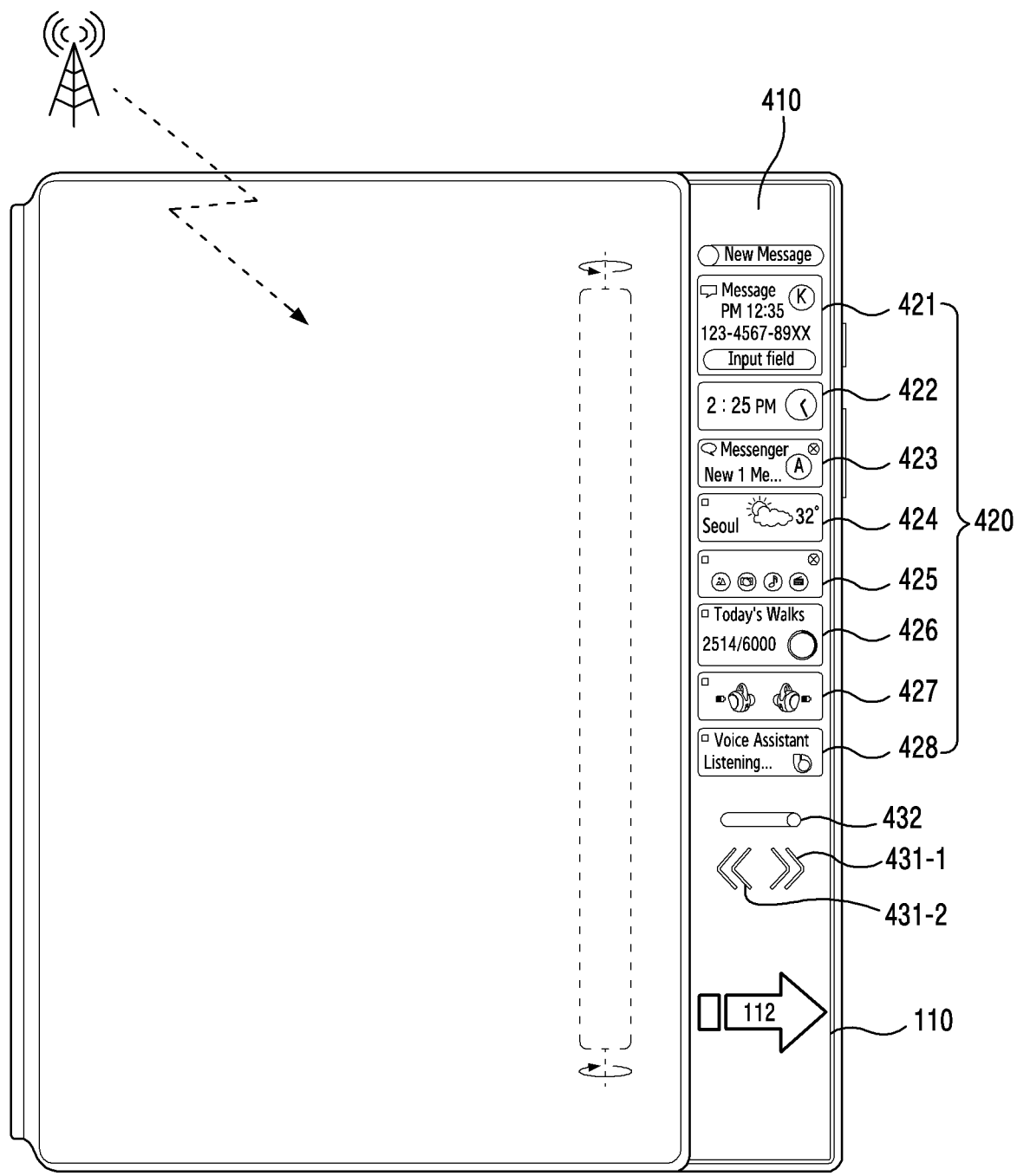
FIG. 4 illustrates a flexible display expanded in a first direction, in response to receiving a message, in an electronic device according to an embodiment.

FIG. 4 illustrates a flexible display expanded in a first direction in response to a message reception in an electronic device according to an embodiment.

Referring to FIG. 4, when the flexible display 110 is expanded in the first direction 112, the first UI 420 includes first message content 421, first clock content 422, first messenger content 423, first weather content 424, first application content 425, first health care content 426, first accessory content 427, and first voice recognition content 428.

The processor can display a sliding controller (e.g., an expansion input 431-1 and a reduction input 431-2) and/or a sliding drag 432 in the first region 410 of the flexible display 110.

Figure 5:
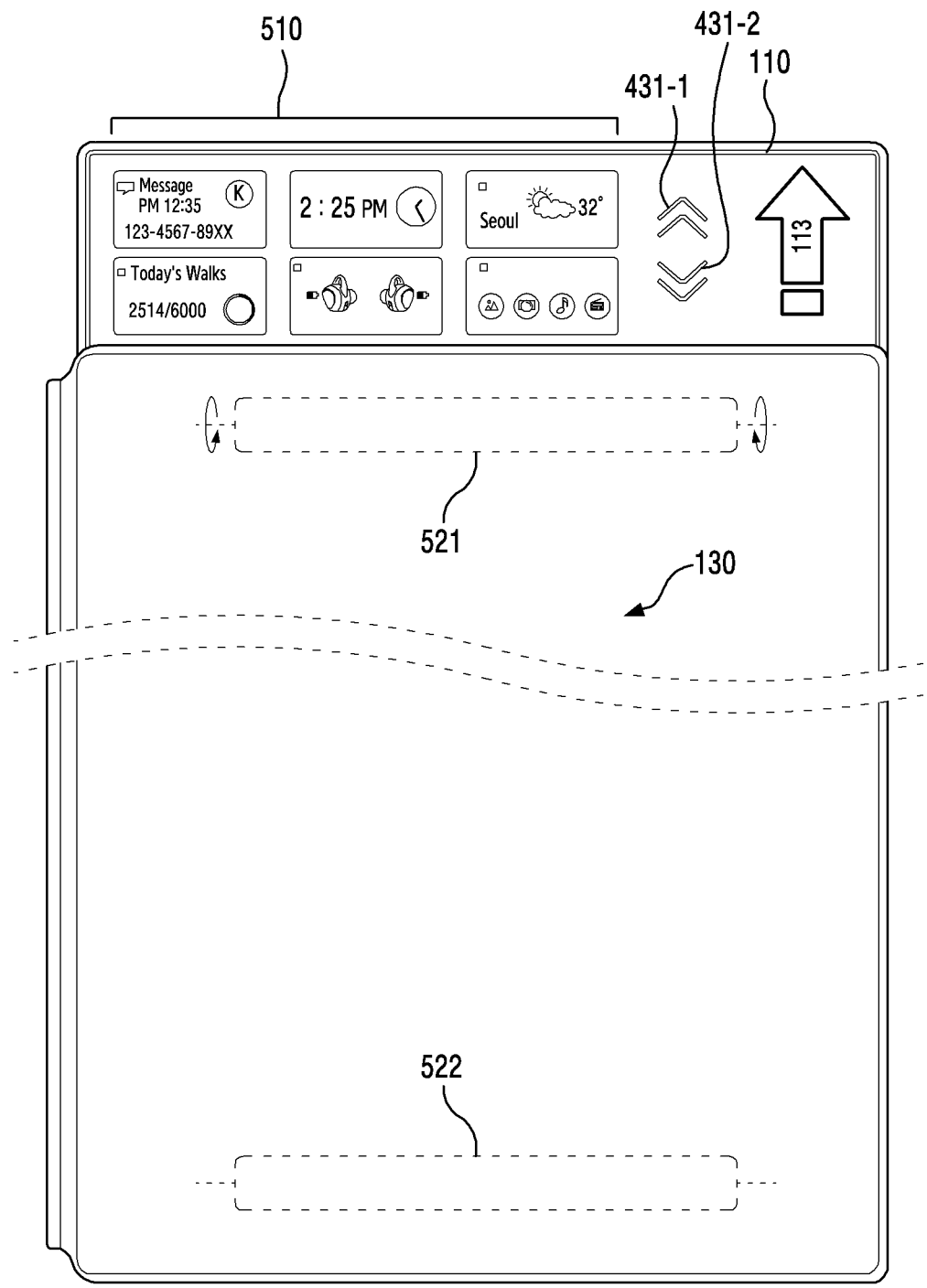
FIG. 5 illustrates a flexible display expanded in a second direction in an electronic device according to an embodiment.

FIG. 5 illustrates a flexible display expanded in a second direction in an electronic device according to an embodiment.

Referring to FIG. 5, a trigger signal can include at least one of a message received through wireless communication, a button input of the electronic device, the attachment/detachment of an electronic pen 910, a button input of a wirelessly connected electronic pen, a button input of a wireless earphone, a knock signal for the cover 130, a knock signal for the flexible display 110, and a voice command (e.g., Hi Bixby, knock knock, and camera).

The electronic device includes a plurality of rolling actuators 521 and 522 for expanding and retracting the flexible display 110 while the cover 130 is closed. For example, the second rolling actuator 521 expands the flexible display 110 in the second direction 133 while the cover 130 is closed, and the third rolling actuator 522 expands the flexible display 110 in the third direction, which is opposite to the second direction 113.

When acquiring the trigger signal, the processor can determine the expansion direction of the flexible display 110, based on a mounting state of the electronic device (e.g., an angle and direction of the electronic device). The processor can determine the mounting state of the electronic device by using a gyro sensor and/or an acceleration sensor. When a first surface of the electronic device faces upward, the processor can control the second rolling actuator 521 to expand the flexible display 110 in the second direction 113.

When a second surface, disposed in the opposite direction to the first surface of the electronic device, faces upward, the processor can control the third rolling actuator 522 to expand the flexible display 110 in the third direction.

When acquiring the trigger signal, the processor can determine the expansion direction of the flexible display 110, based on a standing state of the electronic device.

When the electronic device is in the standing state by the cover 130, i.e., when the electronic device is held in a standing state by the cover, the processor can determine the expansion direction of the flexible display 110, based on a standing direction.

For example, when the standing state of the electronic device is horizontal standing, the processor can expand the flexible display 110 in the second direction 113 and/or the third direction by using the second rolling actuator 521 and/or the third rolling actuator 522. However, when the standing state of the electronic device is vertical standing, the processor can expand the flexible display 110 in the first direction by using the first rolling actuator 120. However, the above-described expansion directions of the standing states are only examples and the disclosure is not limited thereto.

Figure 6:
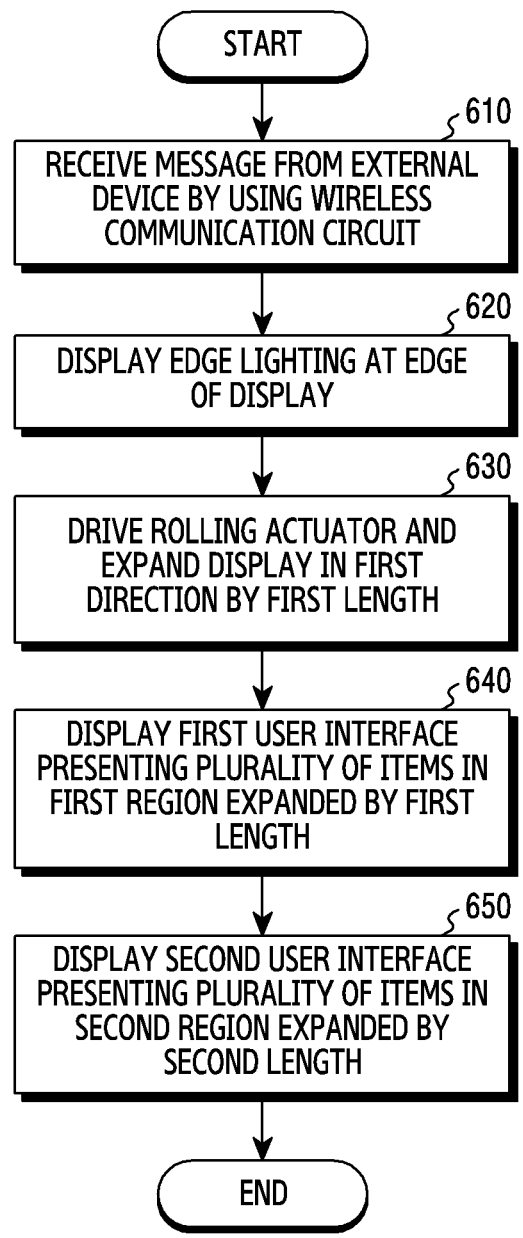
FIG. 6 is a flowchart illustrating a process of expanding a flexible display in response to a message reception in an electronic device according to an embodiment.

FIG. 6 is a flowchart illustrating a process of expanding a flexible display in response to a message reception in an electronic device according to an embodiment.

Referring to FIG. 6, in step 610, the electronic device, e.g., a processor therein, receives a message from an external device, e.g., by using a wireless communication circuit.

In step 620, the processor displays edge lighting on an edge of the flexible display in response to receiving the message. The edge lighting can be expressed in at least one color among a plurality of colors.

The processor can change a color and/or a lighting period of the edge lighting according to the type of the received message. For example, when receiving an emergency message, the processor can display red-based lighting. The processor can display blue-based lighting when receiving a general message.

The edge lighting can include a plurality of effects, e.g., repeatedly moving along the edge of the flexible display, a stretched strip, a blinking edge, changing to various gradation hues while moving along the edge, scattered light in a particle shape, and a gradation lighting applied inwardly from the edge.

The edge lighting can be a lighting effect of being changed to hues, brightness, and illuminance different from a background color (e.g., a color around the edge lighting).

The edge lighting can be displayed with a UI (e.g., message content) displayed on the flexible display.

The processor can expand the flexible display in order to display the edge lighting. For example, the processor can expand the flexible display in order for the edge lighting to be exposed while the cover is closed.

The processor can expand the flexible display by a third length and expose the edge lighting. For example, the third length can be shorter than a first length. That is, the processor can expand the flexible display by a thickness of the edge lighting and expose the edge lighting to the outside.

The processor can display the edge lighting in at least one region of the flexible display while expanding the flexible display by the first length. That is, the processor can display the edge lighting in one region of the flexible display while starting to expand the flexible display by the first length.

The processor can step the displaying of the edge lighting, when a first time elapses after the flexible display is expanded by the first length. The processor can step the displaying of the edge lighting in response to the flexible display completing the expansion by the first length.

Alternatively, when receiving a message, the processor can expand the flexible display without displaying the edge lighting in step 620.

In step 630, the processor drives the rolling actuator and expands the flexible display by the first length in the first direction.

In step 640, the processor expands the flexible display by the first length, and displays the first UI including various content, in the first region of the flexible display.

In step 650, the processor displays a second UI including content, in the second region of the flexible display expanded by a second length. The second length can be longer than the first length, but is not limited thereto. For example, the second length can be substantially the same as the first length, or can be shorter than the first length.

The processor can expand the flexible display by the second length, in response to a user input selecting at least one content. For example, when the processor acquires a user input for selecting an input field for the message content, the processor can expand the flexible display by the second length, and can display a keyboard panel. The keyboard panel can be a soft input panel (SIP).

The processor can recognize a user's intention based on a power key input, a volume key input, the movement of a cover, a voice command corresponding to a message response, a gesture of the wirelessly connected electronic pen, and/or a button input of the wirelessly connected electronic pen, and can expand the flexible display by the second length in response to the user input.

For example, when the processor acquires an input for a volume up key while the flexible display is expanded by the first length, the processor can expand the flexible display by the second length. When the processor acquires a user's voice command corresponding to message reception (e.g., a voice command such as "I will check the message, please fully expand the display"), the processor can display the flexible display by the second length while the flexible display is expanded by the first length.

The processor can expand the flexible display by the second length in response to a user input selecting an expansion and/or reduction indicator. For example, when acquiring an expansion input and/or sliding drag input of a user to a sliding controller, the processor can control the rolling actuator to expand the flexible display.

The processor can control the rolling actuator to expand the flexible display by the second length.

Alternatively, the processor may perform the steps in FIG. 6 in parallel or omit some of the steps. For example, the processor may perform steps 620 and 630 at the same time, or omit step 630.

Figure 7:
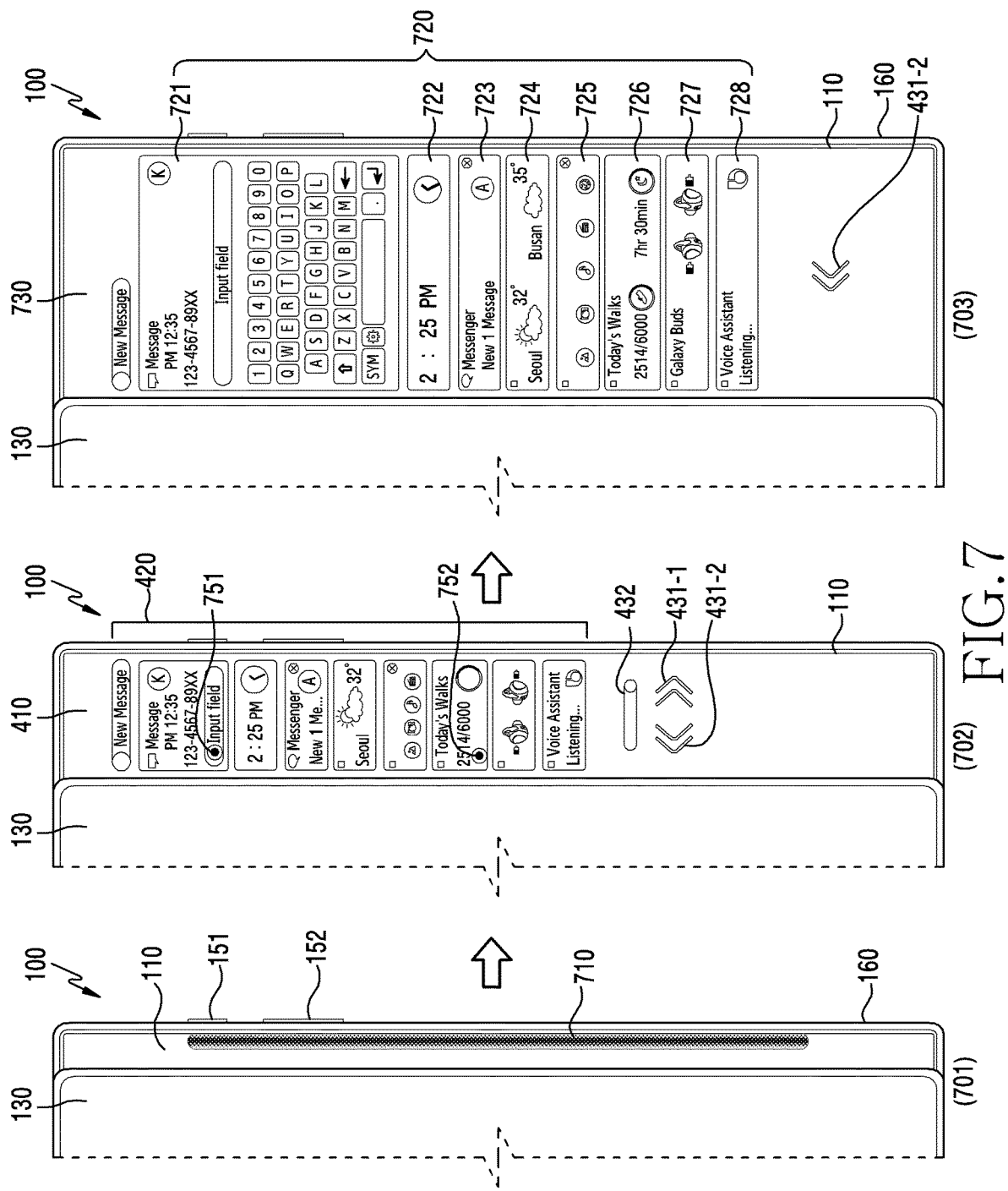
FIG. 7 illustrates an operation of a flexible display, in response to a message reception in an electronic device according to an embodiment.

FIG. 7 illustrates an operation of a flexible display in response to receiving a message in an electronic device according to an embodiment. More specifically, FIG. 7 illustrates the electronic device 100 according to the embodiment illustrated in FIG. 6.

Referring to FIG. 7, in state 701, a processor of the electronic device 100 can display edge lighting 710 on at least one edge of the flexible display 110. To expose the edge lighting 710, the processor can expand the flexible display 110 by a third length, which is shorter than a first length. For example, the third length may correspond to the thickness of the edge lighting 710.

In state 702, the processor can display content through the first UI 420 while the flexible display 110 is expanded by the first length in the first direction.

The processor can display the sliding controller (e.g., the expansion input 431-1 and/or the reduction input 431-2) and the sliding drag 432 while the flexible display 110 is expanded from under the cover 130 by the first length in the first direction.

In response to the expansion input 431-1 and/or sliding drag 432 input of a user to the sliding controller, the processor can expand the flexible display 110 to state 703.

The processor can expand the flexible display 110 to be in state 703 in response to a user's input of touching at least one of the displayed content.

Referring to state 703 of the electronic device 100, the processor can display content through the second UI 720 while the flexible display 110 is expanded by a second length.

The content included in the second UI 720 can include at least some of the content from the first UI 420. For example, the content in the second UI 720 can include message related content 721, time related content 722, messenger related content 723, weather related content 724, application related content 725, healthcare related content 726, accessory device content 727, and voice recognition content 728.

Generally, the processor can present more information in state 703 expanded by the second length than in state 702. For example, when the processor acquires a user's touch input 751 for first message content related to a message in state 702, the processor can expand the flexible display 110 to be in state 703.

The processor can display the second message content 721 including an input field and keyboard information, on the expanded flexible display 110.

When the processor acquires a user's touch input 752 for first healthcare content in state 702, the processor can expand the flexible display 110 to state 703. For example, the processor displays the second healthcare content 726 additionally including step information and/or sleep information, on the expanded flexible display 110.

The processor can display the sliding controller (e.g., the expansion input 431-1 and/or the reduction input 431-2) while the flexible display 110 is expanded by the second length in the first direction.

The processor can reduce the flexible display 110 to state 702 in response to the reduction input 431-2 of the user to the sliding controller.

Figure 8:
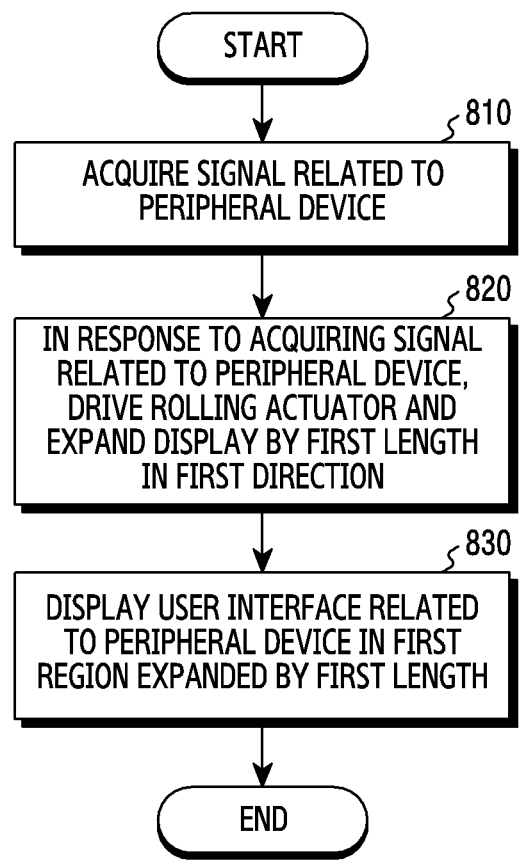
FIG. 8 is a flowchart illustrating a process of expanding a flexible display, in response to obtaining a signal related to a peripheral device, in an electronic device according to an embodiment.

FIG. 8 is a flowchart illustrating a process of expanding a flexible display in response to obtaining a signal related to a peripheral device in an electronic device according to an embodiment.

Referring to FIG. 8, in step 810, the electronic device, e.g., a processor therein, obtains a signal related to the peripheral device.

The signal related to the peripheral device can include a signal related to an electronic pen, a signal related to a wireless earphone, a signal related to a cover, a signal related to a home appliance, and/or a signal related to a vehicle. The signal related to the cover can include a signal for an OPEN state of the cover and a signal for a folding angle between the cover and the electronic device. The signal related to the vehicle can include a signal acquired from a Bluetooth device in the vehicle or an attachment/detachment signal of a vehicle cradle.

The processor can acquire the signal related to the electronic pen, in response to the attachment/detachment of the electronic pen.

The processor can obtain a charge breakaway signal through a wireless charging coil, in response to the attachment/detachment operation of the electronic pen.

The processor can control the rolling actuator to expand and/or reduce the flexible display, in response to obtaining the charge breakaway signal.

The processor can acquire the signal related to the wireless earphone, in response to a button input of the wireless earphone. The processor can acquire a signal including data, such as a charging state of the wireless earphone, a distance to the electronic device, and a communication state.

In step 820, in response to acquiring the signal related to the peripheral device, the processor drives the first rolling actuator and expands the flexible display by a first length in a first direction.

For example, the processor can obtain a charge breakaway signal through the wireless charging coil, in response to the attachment/detachment operation of the electronic pen, and then expand and/or reduce the flexible display in response to obtaining the charge breakaway signal. The processor can expand and/or reduce the flexible display, based on an OPEN signal of the cover and a folding angle between the cover and the electronic device. The flexible display can be expanded and/or reduced in response to an attachment/detachment signal of the vehicle cradle.

In step 830, the processor displays a UI related to the peripheral device in a first region expanded by the first length. For example, when the processor acquires a signal related to an electronic pen, the processor can display a UI related to the electronic pen in at least a portion of the first region of the display.

Figure 9:
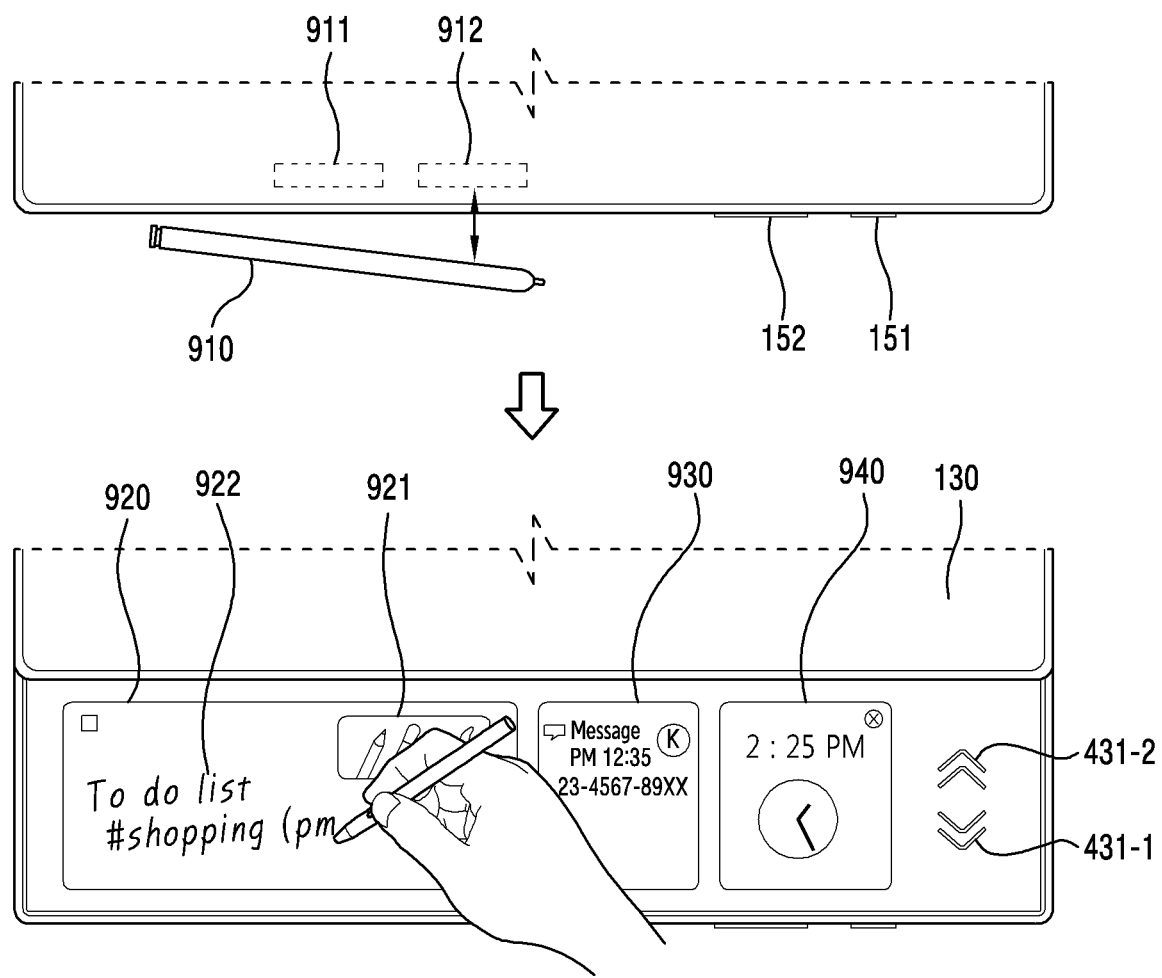
FIG. 9 illustrates a flexible display being expanded/reduced by the attachment/detachment of an electronic pen in an electronic device according to an embodiment.

FIG. 9 illustrates a flexible display expanded/reduced by an attachment/detachment of an electronic pen in an electronic device according to an embodiment.

Referring to FIG. 9, the electronic device include a magnet 911 and a charging coil 912. The electronic device can be electrically and/or operatively connected to an electronic pen 910. The electronic device can be physically connected to the electronic pen 910 by using the magnet 911.

A processor of the electronic device can obtain a charge breakaway signal of the electronic pen 910 through the wireless charging coil 912.

The processor can expand the flexible display by a first length in response to the charge breakaway signal of the electronic pen 910. The processor can expand the flexible display, by controlling the rolling actuator to expand the flexible display, in response to a detachment operation of the electronic pen 910.

The processor can display a UI presenting a writing window 920, message related content 930, and time information related content 940, through a first region of the expanded flexible display.

The processor can display handwriting 922 corresponding to a touch of the electronic pen 910 through the writing window 920.

In response to the expansion input 431-1 to the sliding controller, the processor can further expand the flexible display 110 and further expand a memo interaction including the writing window 920. The writing window 920 can include content related to an electronic pen tool 921.

The processor can activate a wireless connection between the electronic device and the electronic pen 910 in response to a charge breakaway signal of the electronic pen 910. That is, when the electronic pen 910 is detached from the electronic device, the processor can transmit and/or receive signals with the electronic pen 910 in order to acquire a button 950 input from the electronic pen 910.

While the flexible display 110 is expanded by the first length, the processor can expand the flexible display 110 by a second length longer than the first length in response to the button 950 input of the electronic pen 910 wirelessly connected.

The electronic pen 910 can transmit an expansion signal to the electronic device in response to an input of at least one button included in the electronic pen 910. The processor can acquire the expansion signal and control the rolling actuator to expand the flexible display 110.

The processor can reduce the flexible display 110, by controlling the rolling actuator to reduce the flexible display 110 in response to an attachment operation of an accessory device.

In response to an attachment operation of the electronic pen 910, the processor can store handwritten content that is being written.

The processor can store the handwritten content that is being written, and simultaneously turn off the power of the flexible display 110.

Figure 10:
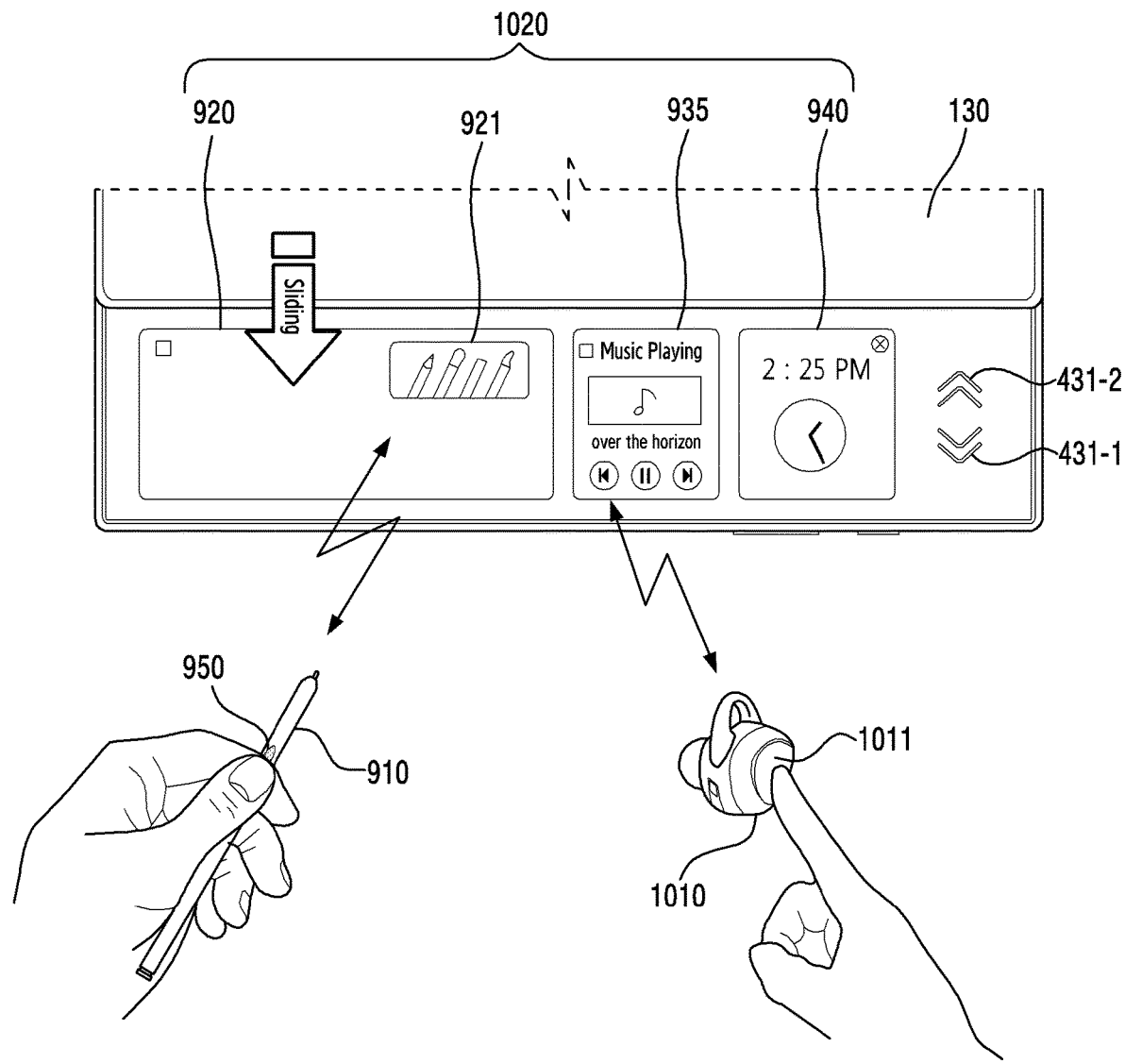
FIG. 10 illustrates expansion of a flexible display, in response to a signal from a peripheral device, in an electronic device according to an embodiment.

FIG. 10 illustrates expansion of a flexible display in response to a signal from a peripheral device in an electronic device according to an embodiment.

Referring to FIG. 10, while the flexible display 110 is expanded by a first length from under the cover 130, a processor of the electronic device can display a UI 1020 including the writing window 920, a music player 935, and time information related content 940 through at least a portion of the expanded first region.

In response to a remote control input (e.g., a Bluetooth™ low energy (BLE) signal) of a peripheral device, the processor can control the rolling actuator to expand the flexible display 110.

The processor can display a notification interface corresponding to the remote control input of the peripheral device through a first region of the expanded flexible display 110. For example, the processor can present a memo content interaction related to a memo in response to a button input (e.g., push/double tap) of the electronic pen 910 wirelessly connected. The button input can be an input for at least one button 950 included in the electronic pen 910.

In response to a motion input signal (e.g., a directional gesture) through at least one sensor (e.g., a 6-axis sensor) of the electronic pen 910, the processor can display an interface related to a camera application in at least one region of the flexible display 110.

The processor can activate at least one camera (e.g., a front camera) in response to a motion input signal through at least one sensor of the electronic pen 910.

In response to a touch input (e.g., a short tap, a double tap, a long tap, etc.) of the wireless earphone 1010, the processor can present an interaction related to music to the first region of the expanded flexible display 110.

The processor can control the rolling actuator to expand the flexible display 110, in response to communication connection information (e.g., an advertising signal) broadcast from the peripheral device.

The processor can present a notification interaction related to the peripheral device through the first region of the expanded flexible display 110. For example, the processor can present a notification interaction (e.g., smart things) for displaying a battery status of the wireless earphone 1010, in response to communication connection information received in response to opening a case of the wireless earphone 1010, or in response to a touch input 1011 on the wireless earphone 1010.

The processor can present a home appliance related interaction (e.g., a washing end notification) in response to an advertising signal received from a nearby home appliance. For example, when receiving the washing end signal from a washing machine, the processor can display content related to the washing end notification on at least a portion of the first region of the expanded flexible display 110.

When the electronic device approaches a vehicle at a first distance or less, the processor can present a vehicle related interaction through the first region of the flexible display 110, in response to a communication connection signal of an electronic device (e.g., a computing device) of the vehicle. The vehicle related interaction can include a vehicle inspection state (e.g., a tire pressure and a component state), a door opening/closing state, a security state, a vehicle battery state, a vehicle air conditioning system state, a vehicle interior air cleaning state, a navigation and/or a music player.

Figure 11:
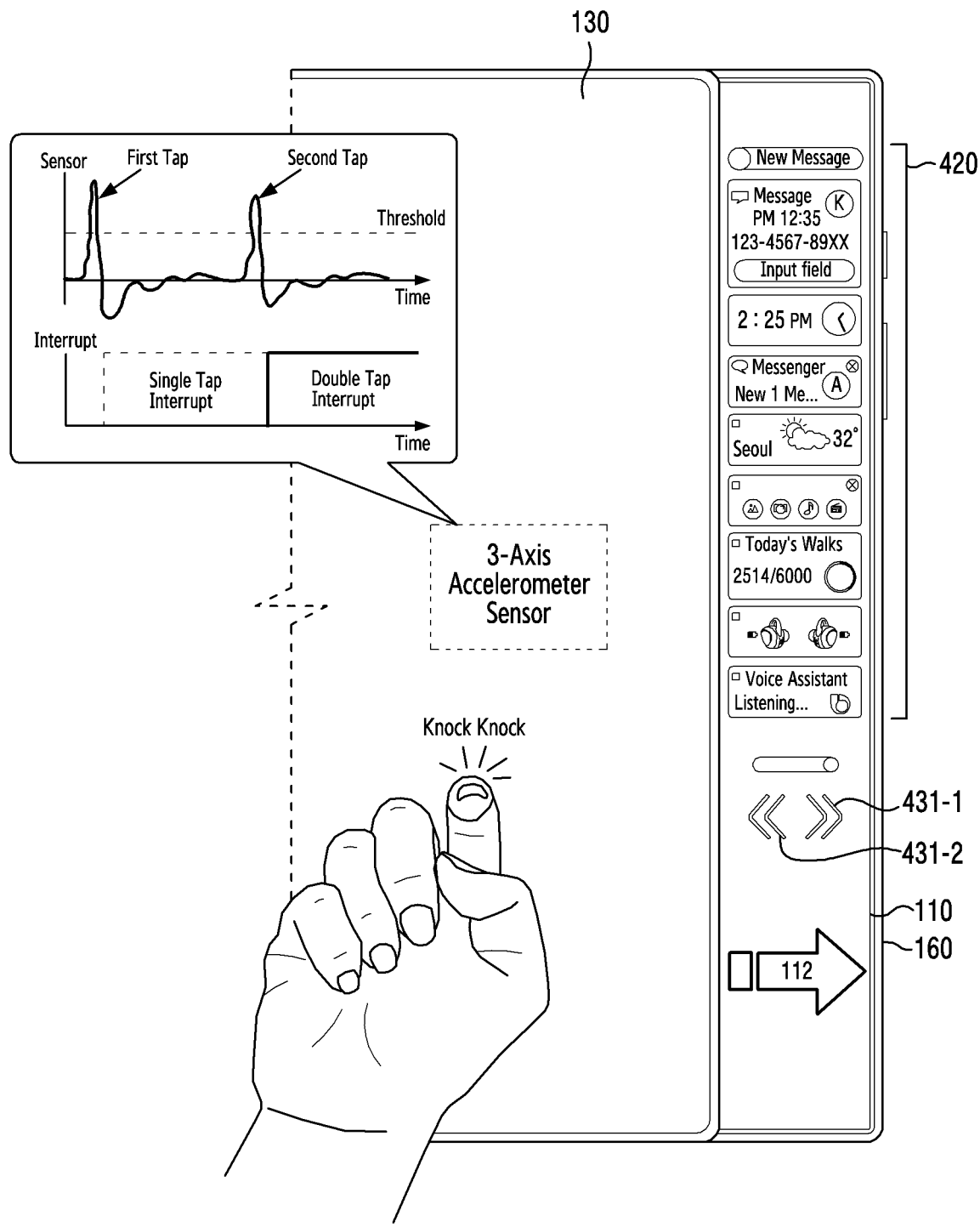
FIG. 11 illustrates expansion of a flexible display, in response to a knock signal, in an electronic device according to an embodiment.

FIG. 11 illustrates expansion of a flexible display in response to a knock signal in an electronic device according to an embodiment.

Referring to FIG. 11, the electronic device, e.g., a processor therein, can acquire a gesture signal through at least one sensor, e.g., through a sensor circuit including an acceleration sensor.

The gesture signal can be understood as a double tap signal.

The gesture signal can be understood as the double tap signal and also a signal acquired in response to acquiring pressure signals of at least a first threshold value during a first period.

For example, the processor can acquire motion data acquired using a 9-axis motion sensor. When a signal of at least a first intensity s obtained twice on a first axis of the acquired motion data during a first time period, the processor can recognize this as a gesture corresponding to the double tap.

The processor can control the rolling actuator to expand the flexible display 110 in the first direction 112, in response to acquiring the gesture signal. For example, the processor can control a first rotation operation of the rolling actuator.

The processor can present a notification interaction through an expanded region of the expanded flexible display 110. For example, in response to the double tap signal, the processor can expand the flexible display 110 and display a notification interface through the expanded region.

The processor can acquire a pressure signal that is greater than or equal to a threshold value through at least one sensor. For example, the processor can acquire a pressure signal of at least a second threshold value from outside of the cover 130 and/or the electronic device through a force sensor.

Based on the pressure signal, the processor can expand the flexible display 110 and display the notification interface.

While the cover 130 is closed, the processor can expand the flexible display 110, when obtaining a movement (e.g., an external shock) of the electronic device through at least one sensor.

The processor can acquire image data by using a camera exposed through the sliding housing (e.g., the second housing 160) and the expanded flexible display 110.

The processor can perform face recognition based on the acquired image data. Also, the processor can perform security authentication, based on a face recognition function. Accordingly, the processor can obtain a theft situation through the security authentication and make an emergency call through another external device electrically and/or operatively connected.

Figure 12:
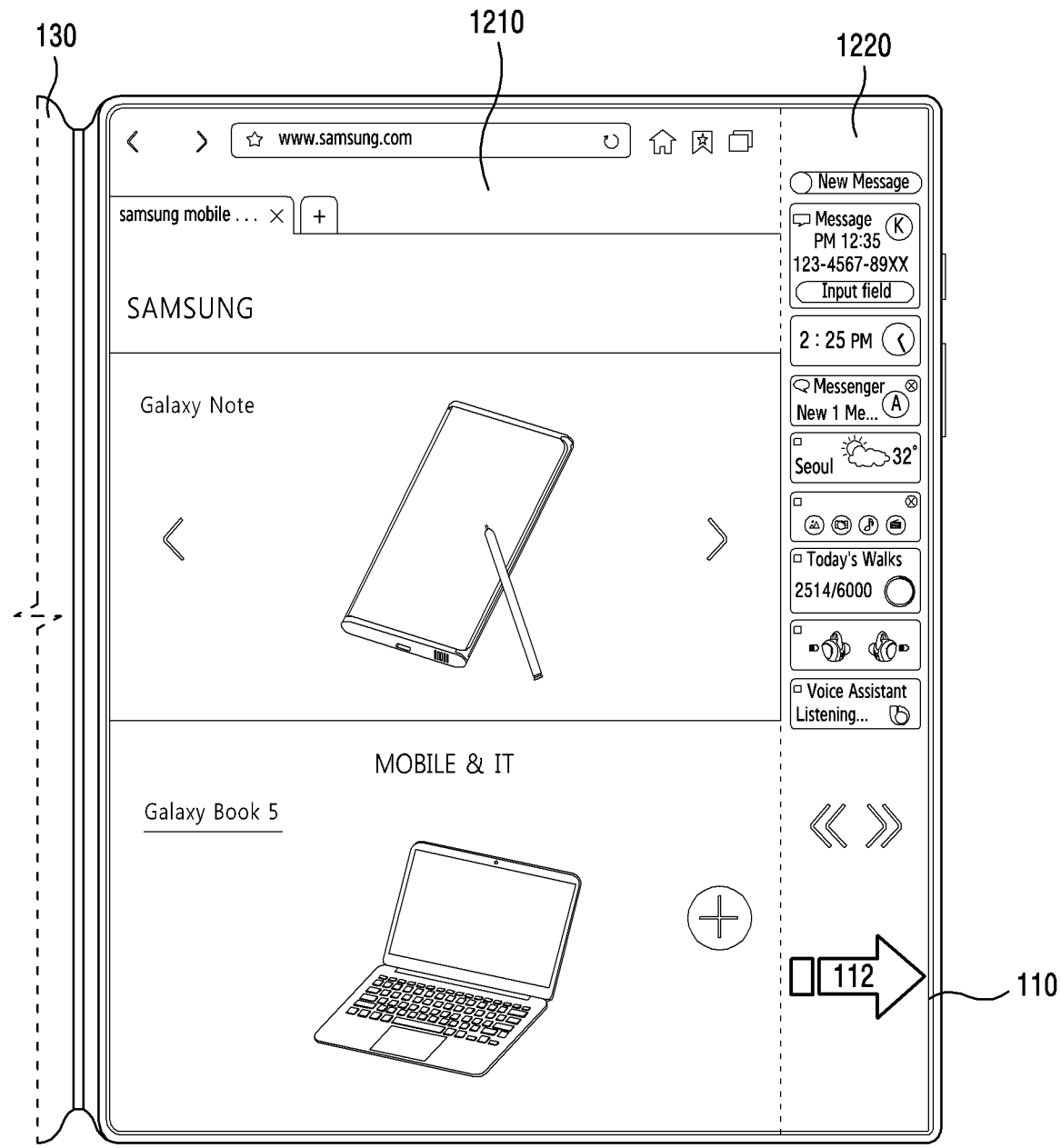
FIG. 12 illustrates a UI displayed through a flexible display while a cover is opened in an electronic device according to an embodiment.

FIG. 12 illustrates a UI displayed through a flexible display in an open state of a cover in the electronic device according to an embodiment.

Referring to FIG. 12, the electronic device includes a sensor (e.g., a magnetic field sensor) that can check an open/close state of the cover 130. A processor of the electronic device can determine that the cover 130 is in an open state by using the sensor (e.g., a magnetic field sensor).

The processor can expand the flexible display 110 for a multitasking operation while the cover 130 is open. The processor can also expand the flexible display 110 in response to a trigger signal (e.g., message reception), regardless of a position of the cover 130.

The processor can divide the flexible display 110 into an expanded sliding screen 1220 and a basic screen 1210 and display individually different interfaces. For example, when receiving a message while playing a video, the processor can expand the flexible display 110 through a sliding operation of the flexible display 110.

The processor can maintain a video that is being played through the basic screen 1210 and present an interaction with a message that is received through the expanded sliding screen 1220. As another example, when a message is received during video playback, the processor can display a pop-up icon on one region of the basic screen 1210 of the flexible display 110.

When the processor acquires a user input for the pop-up icon, the processor can expand the flexible display 110 through a sliding operation in the first direction 112.

The processor can maintain a video that is being played through the basic screen 1210, and present an interaction with a message that is received through the expanded sliding screen 1220.

Figure 13:
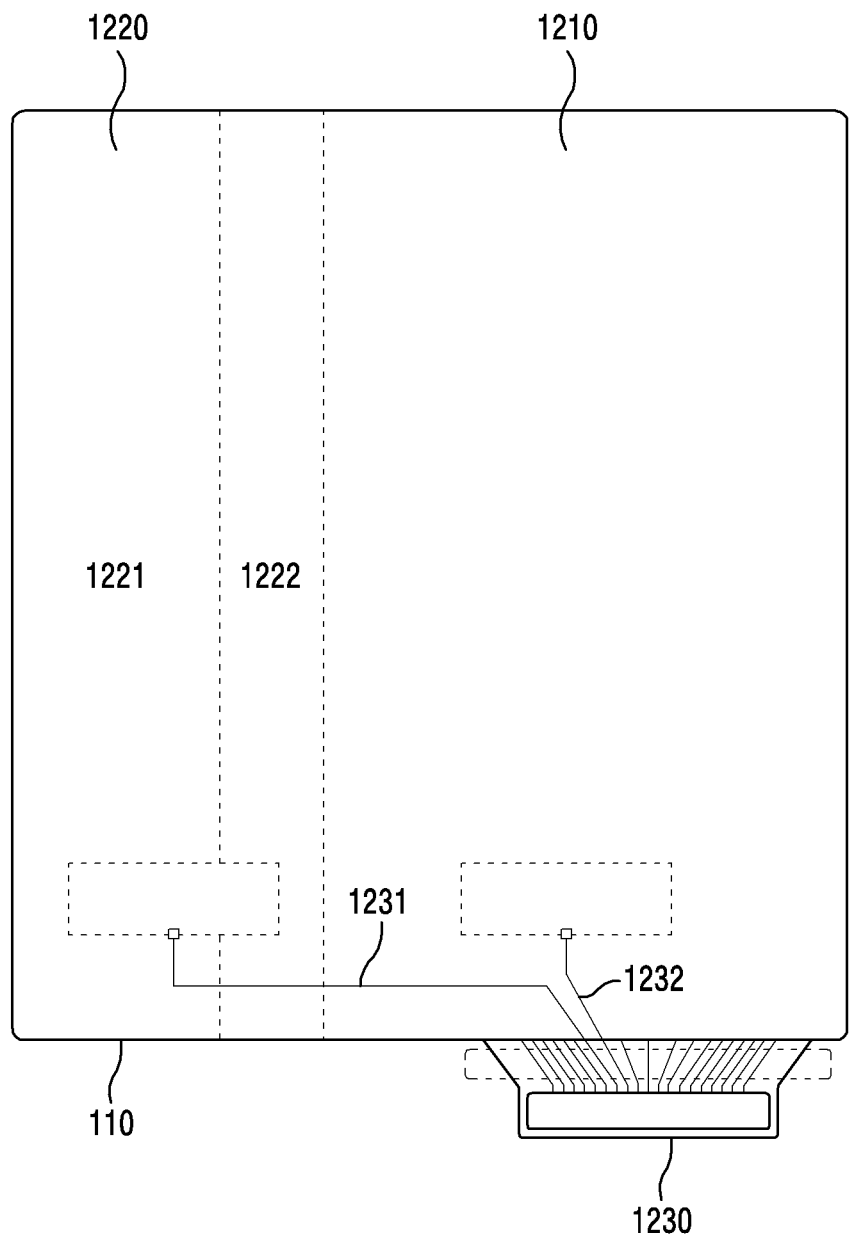
FIG. 13 illustrates a flexible display and a circuit partially controlling a flexible display in an electronic device according to an embodiment.

FIG. 13 illustrates a flexible display and a circuit partially controlling a flexible display in an electronic device according to an embodiment. More specifically, FIG. 13 illustrates a flexible display 110 and a display driver integrated circuit (DDI) 1230 for partially controlling the flexible display 110.

Referring to FIG. 13, the flexible display 110 includes a basic screen 1210 and a sliding screen 1220.

The basic screen 1210 can be disposed in a front surface of the electronic device regardless of the expansion or reduction of the flexible display 110. The sliding screen 1220 is a region in which the display 110 is rolled, and can be expanded and retracted.

The sliding screen 1220 includes a first portion 1221 and a second portion 1222. For example, the first portion 1221 is a non-bent portion and the second portion 1222 is a bent portion. Alternatively, the first portion 1221 and the second portion 1222 may be bent. In other words, the sliding screen 1220 may be a fully rolling display, and the first portion 1221 and the second portion 1222 can be rolled inside the electronic device.

A processor of electronic device can partially control the flexible display 110 while the cover is closed. In response to a trigger signal (e.g., receiving a message), the processor can acquire size information of an expanded screen and a partial screen control signal.

The processor can partially control the flexible display 110 through the DDI 1230, based on the size information and the control signal. For example, the processor can control the sliding screen 1220 through a first circuit 1231, and control the basic screen 1210 through a second circuit 1232.

The processor can determine whether to execute a power saving mode for each region of the flexible display 110. In response to a trigger signal, the processor can display a black screen of a sleep state with respect to the basic screen 1210 covered with the cover, and display a notification interface with respect to the sliding screen 1220.

The processor can determine whether to apply power to the flexible display 110 for each region. For example, in response to a trigger signal, the processor can perform a power OFF operation with respect to the basic screen 1210 covered with the cover, and perform a power ON operation with respect to the sliding screen 1220 and display a notification interface.

As another example, the processor can reduce a brightness value of the basic screen 1210 covered with the cover to a first brightness value (e.g., a minimum brightness value), and keep a brightness value of the sliding screen 1220 as a default brightness value.

The processor can adjust an expanded length of the flexible display 110 and determine a ratio and/or resolution of the flexible display 110 disposed in the front surface.

The processor can set a ratio of the flexible display 110 to a first ratio (e.g., 4:3) without expanding the flexible display 110, and set a resolution corresponding to the first ratio.

The processor can expand the flexible display 110 by a first length, wherein the ratio of the flexible display 110 becomes a second ratio (e.g., 16:9), and can set a resolution corresponding to the second ratio.

As another example, the processor can expand the flexible display 110 by a second length, wherein the ratio of the flexible display 110 becomes a third ratio (e.g., 21:9), and can set a resolution corresponding to the third ratio. The first to third ratios can be variously determined according to a degree of expansion of the flexible display 110.

The DDI 1230 can be disposed in at least one region of the basic screen 1210. That is, since the sliding screen 1220 includes a bent portion, the DDI 1230 can be disposed in at least one region of the basic screen 1210 that is not deformed in shape.

The DDI 1230 can be operatively connected to the basic screen 1210 and the sliding screen 1220 through a plurality of circuits.

The DDI 1230 can be attached to and be disposed on a back surface of the basic screen 1210 when viewed from the front of the flexible display 110.

Figure 14:
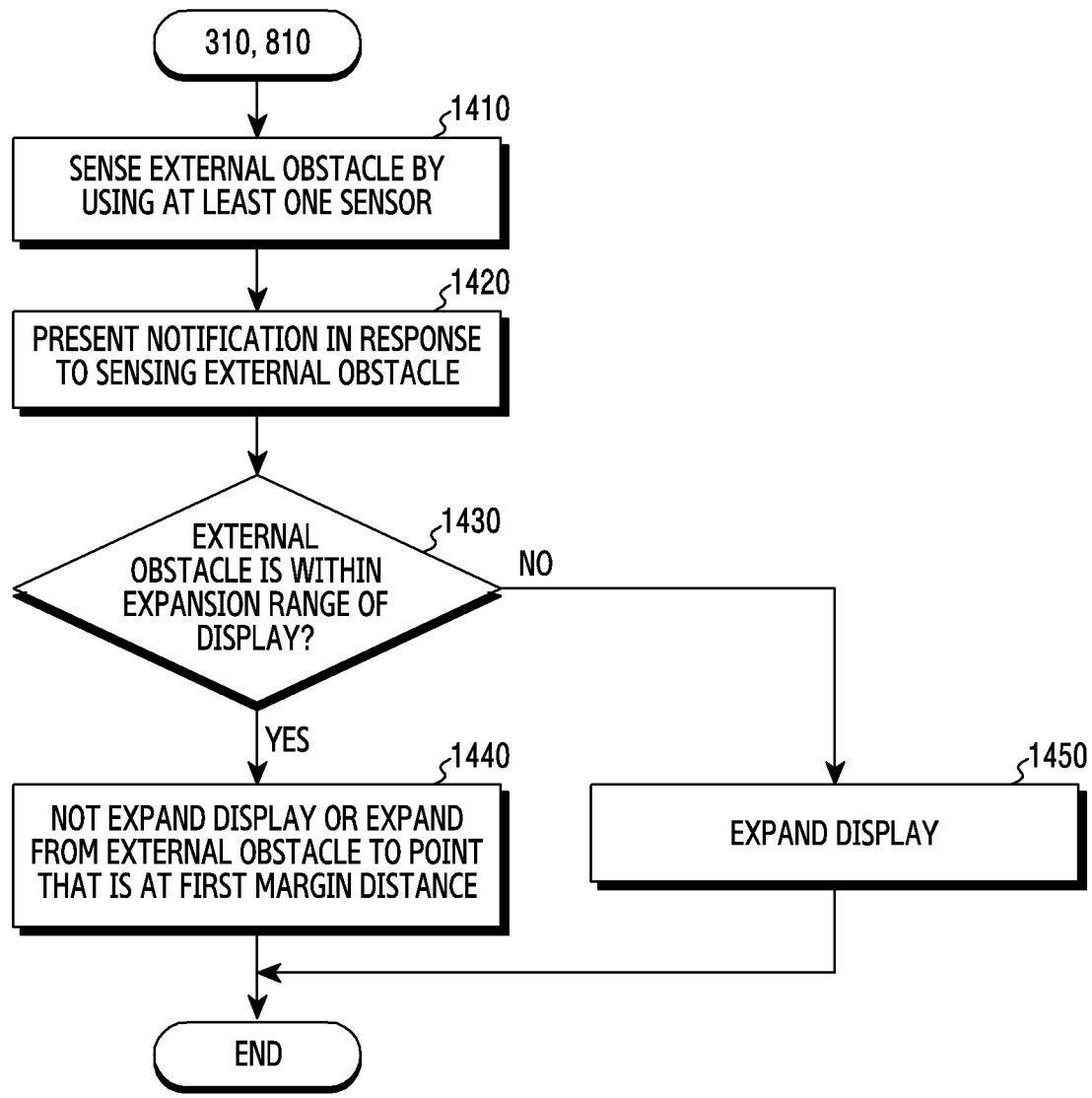
FIG. 14 is a flowchart illustrating a control operation of a flexible display, when an external obstacle is obtained, in an electronic device according to an embodiment.

FIG. 14 is a flowchart illustrating a control operation of a flexible display, when an external obstacle is obtained, in an electronic device according to an embodiment. For example, the control operation illustrated in FIG. 14 may be performed subsequent to step 310 of FIG. 3 and/or step 810 of FIG. 8.

Referring to FIG. 14, in step 1410, the electronic device, e.g., a processor therein, senses an external obstacle by using at least one sensor. The at least one sensor can be disposed at an edge of the electronic device toward an expansion direction of the flexible display.

The processor can scan the external obstacle through at least one proximity sensor disposed on one side surface of the sliding housing before expanding the flexible display in response to a trigger signal (e.g., a received message).

The at least one proximity sensor can include an optical sensor, an ultrasonic sensor, and/or a capacitive sensor. The optical sensor can measure, through a receiver, a change of time at which IR rays outputted from a transmitter are reflected and received. The ultrasonic sensor can measure, through a microphone, a change of time at which ultrasonic waves outputted from a speaker are reflected and received. The capacitive sensor can obtain a change of capacitance of the housing.

In step 1420, the processor presents a notification in response to obtaining the external obstacle.

The processor can output a warning sound through the speaker, in response to obtaining the external obstacle. Alternatively, the processor can display edge lighting in one region of the flexible display, in response to obtaining the external obstacle.

In step 1430, the processor determines whether the external obstacle is within a maximum expansion range of the flexible display. For example, when the maximum expansion range of the flexible display is about 5 cm, the processor can determine whether the distance between the external obstacle and the electronic device is within about 5 cm.

In step 1440, when the distance between the external obstacle and the electronic device is within the maximum expansion range of the flexible display, the processor does not expand the flexible display or expands the flexible display only to a point that is a first margin distance from the external obstacle.

When the processor recognizes the external obstacle through the at least one proximity sensor, the processor can stop the expansion of the flexible display by stopping a rotation operation of the rolling actuator. When the processor senses the external obstacle or determines that the sensed external obstacle is within the expansion range of the flexible display, the processor can stop the rotation operation of the rolling actuator at a time point of sensing or determining.

When sensing an external obstacle, the processor can expand the flexible display to a first margin distance from the external obstacle. For example, when the external obstacle is about 4 cm away from the electronic device in a first expansion direction of the flexible display, the processor can expand the flexible display by about 3 cm in the first expansion direction, at the first margin distance (e.g., about 1 cm) from the external obstacle.

In step 1450, the processor expands the flexible display, after determining that the external obstacle is not within the maximum expansion range of the flexible display in step 1430. Although the processor senses the external obstacle, the processor can still expand the flexible display, e.g., based on a trigger signal, when the external obstacle is outside the maximum expansion range of the flexible display.

Figure 15A:
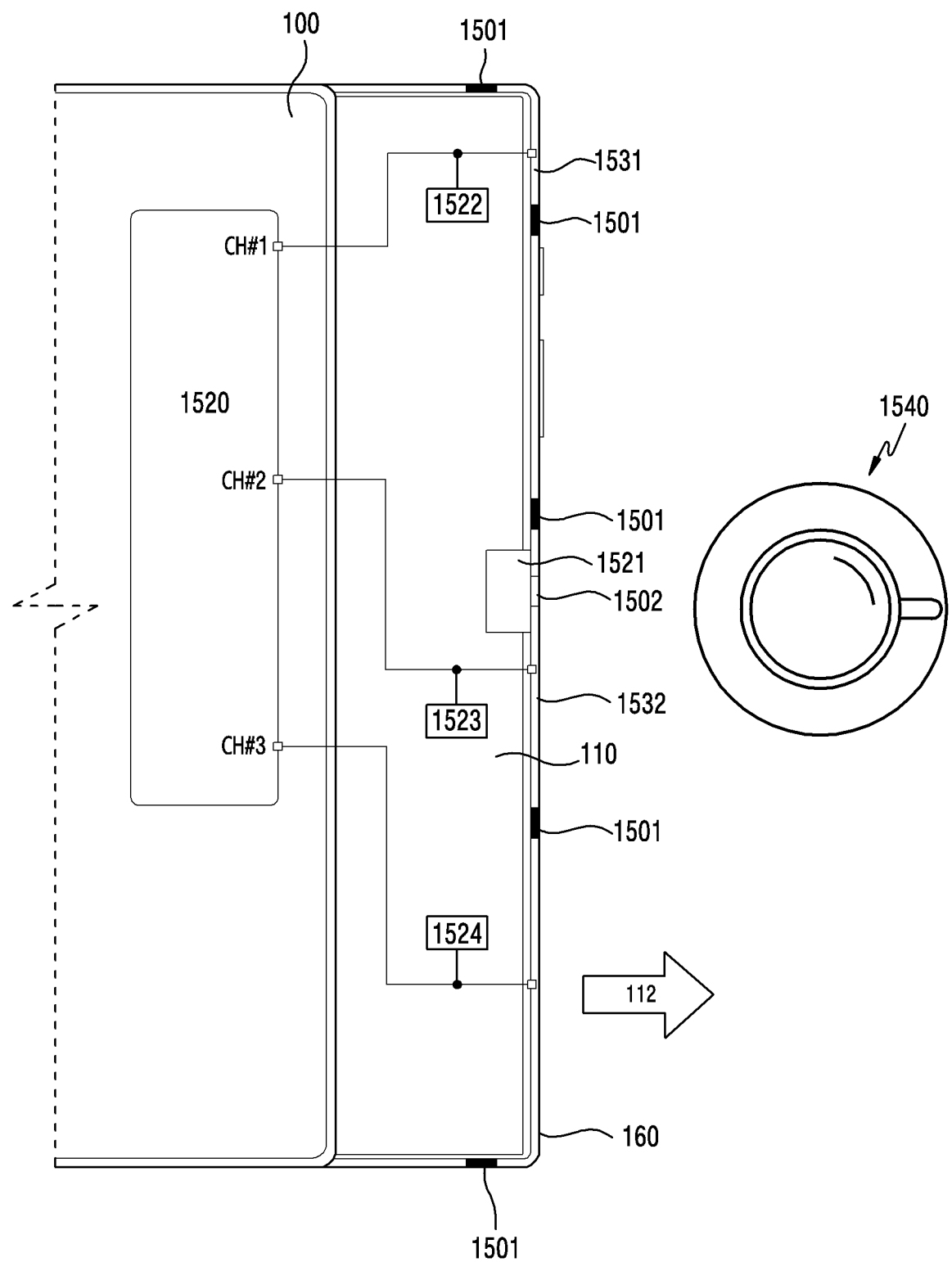
FIG. 15A illustrates a sensor for sensing an external obstacle in an electronic device according to an embodiment.
Figure 15B:
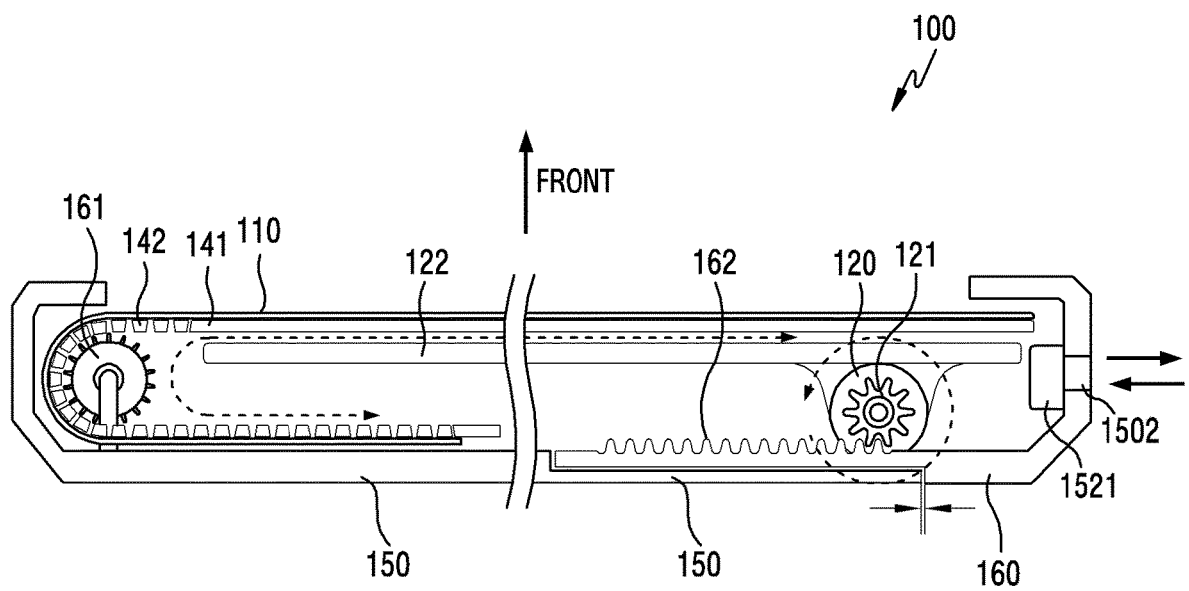
FIG. 15B illustrates a rolling actuator and a sensor for sensing an external obstacle in an electronic device according to an embodiment.

FIG. 15A illustrates a sensor for sensing an external obstacle in an electronic device according to an embodiment. FIG. 15B illustrates a rolling actuator, and a sensor for sensing an external obstacle, in an electronic device according to an embodiment Referring to FIGS. 15A and 15B, the electronic device 100 includes a slit 1501, an opening 1502, a radio frequency (RF) circuit 1520, a first frame antenna 1531, a second frame antenna 1532, and a third frame antenna 1533.

The electronic device 100 can include a plurality of sensors for recognizing an obstacle during a sliding operation in the first direction 112. For example, the electronic device 100 includes an optical sensor 1521, a first capacitive sensor 1522, a second capacitive sensor 1523, and a third capacitive sensor 1524. The electronic device 100 can also include an ultrasonic sensor.

The electronic device 100 includes a plurality of frame antennas in a region separated from the sliding housing 160 through the slit 1501 of the sliding housing 160. The plurality of frame antennas can be combined with a plurality of capacitive sensors (e.g., a grip sensor). For example, the first frame antenna 1531 is connected to the first capacitive sensor 1522, the second frame antenna 1532 is connected to the second capacitive sensor 1523, and the third frame antenna 1533 is connected to the third capacitive sensor 1524.

The capacitive sensors can be connected in parallel to the RF circuit (e.g., an RF feeding line) 1520, and can measure a change of a capacitive threshold value for a front obstacle within about 10 to 20 mm. The optical sensor 1521 can transmit and/or receive a signal through the opening 1502 formed in at least one region of the sliding housing 160. The optical sensor 1521 can be electrically and/or operatively connected to a processor.

The processor can independently operate a proximity sensor in response to a trigger signal (e.g., message reception) received through at least one antenna.

Referring to FIG. 15B, in response to an expansion event of the flexible display 110, the first rolling actuator 120 can operate by receiving a voltage.

The first rolling actuator 120 can be coupled to the first frame 122, and the first frame 122 can be fixed inside the electronic device 100.

The first rolling actuator 120 can control the sliding housing 160 to linearly move forward and backward by rotating the rotation gear 121. The sliding rail 162 included in the sliding housing 160 can be engaged with the rotation gear 121, and convert the rotational motion of the rotation gear 121 into a straight-line motion. For example, the first rolling actuator 120 can rotate the rotation gear 121 in the second rotation direction (e.g., the counterclockwise direction based on the drawing), and control and protrude the sliding housing 160 to linearly move in the expansion direction of the flexible display 110.

In response to the straight-line motion of the sliding housing 160, the first plate 141 coupled to one region of the first frame 122 can move to correspond to a movement direction of the sliding housing 160.

In response to the movement of the first plate 141, the roller 161 can rotate in the first rotation direction, which is opposite to the second rotation direction of the first rolling actuator 120 (e.g., the clockwise direction based on the drawing).

The roller 161 can roll-up the flexible display 110 while rotating in the first rotation direction.

When the flexible display 110 combined with the first plate 141 and the multi-plate 142 is rolled up, the flexible display 110 inserted into the electronic device 100 can be protruded outward while being expanded.

As the multi-plate 142 is rolled-up in the first direction 112, the roller 161 engaged with the multi-plate 142 can rotate.

The roller 161 can be coupled to the first housing 150. Unlike the sliding housing 160, the first housing 150 is fixed to the electronic device 100 and may not move.

Figure 16:
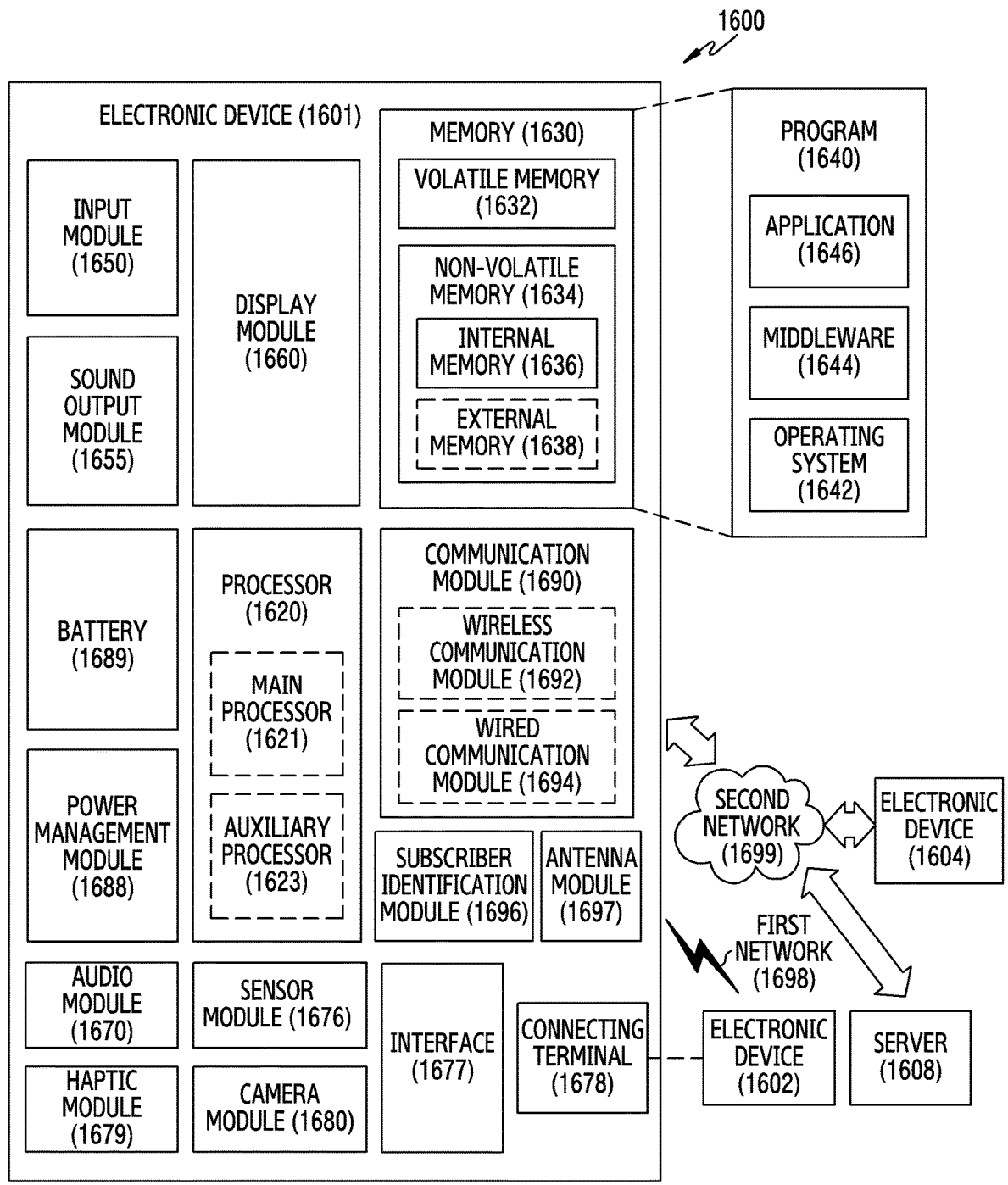
FIG. 16 illustrates an electronic device in a network environment according to an embodiment.

FIG. 16 illustrates an electronic device 1601 in a network environment 1600 according to an embodiment.

Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). The electronic device 1601 may communicate with the electronic device 1604 via the server 1608. The electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634.

According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high-definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the AP) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™ wireless-fidelity (Wi-Fi) direct, or IR data association (IrDA)) or the second network 1699 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the SIM 1696.

The wireless communication module 1692 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., an RF integrated circuit (RFIC)) other than the radiating element may be additionally formed as part of the antenna module 1697.

According to various embodiments, the antenna module 1697 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or MEC. In another embodiment, the external electronic device 1604 may include an Internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In accordance with an embodiment, an electronic device includes a flexible display, a rolling actuator for expanding or reducing the flexible display, a wireless communication circuit, and at least one processor electrically connected to the flexible display, the rolling actuator, and the wireless communication circuit. The processor can receive a message from an external device by using the wireless communication circuit. In response to receiving the message, the processor can drive the rolling actuator to expand the flexible display by a first length in a first direction. The processor can display a first UI presenting a plurality of contents, in the first region expanded by the first length. The first UI can include a first content associated with the message and a second content distinct from the first content.

The processor can drive the rolling actuator in a state of being expanded by the first length and expand the flexible display by a second length in the first direction.

The processor can obtain a signal of a peripheral device operatively connected to the electronic device. In response to obtaining the signal of the peripheral device, the processor can display content related to the peripheral device through the first region of the flexible display.

The signal of the peripheral device can include at least one of a signal related to an electronic pen, a signal related to a wireless earphone, a signal related to a home appliance, and a signal related to a vehicle.

The processor can acquire a user input of touching at least one of the plurality of contents or touching a sliding controller for expanding the flexible display. In response to acquiring the user's input, the processor can expand the flexible display by the second length. The processor can display a second UI presenting a plurality of contents including more information than the plurality of contents, in a second region in which the flexible display is expanded by the second length.

The processor can output edge lighting at at least one edge of the flexible display in response to receiving the message.

When the processor obtains an external shock through the electronic device or a cover coupled to the electronic device, the flexible display can be expanded by the first length in the first direction. The external shock can include a double tap, or a tap having a predetermined pressure or more.

The electronic device can include at least one proximity sensor, and the processor can obtain an external obstacle by using the at least one proximity sensor. In response to obtaining the external obstacle, the processor 230 can present an obtaining notification.

The processor can acquire image data through a camera, when obtaining the external shock. The processor can perform face recognition, based on the acquired image data. The processor can perform security authentication by comparing a recognized face with a face stored in the electronic device. When the recognized face and the face stored in the electronic device do not match, the processor can output at least one of a warning message and a warning sound.

The processor can divide a basic region of the flexible display and the first region expanded by the first length. The processor can execute a first application through the basic region and execute a second application through the first region.

In accordance with an embodiment, a method is provided for operating an electronic device. The method includes receiving a message from an external device by using a wireless communication circuit, in response to receiving the message, driving a first rolling actuator and expanding a flexible display by a first length in a first direction, and displaying a first UI presenting a plurality of contents, in a first region expanded by the first length. The first UI can include a first content associated with the message and a second content distinct from the first content.

The method further includes obtaining a signal of a peripheral device operatively connected to the electronic device, and displaying content related to the peripheral device through the first region of the flexible display in response to obtaining the signal of the peripheral device.

The method further includes acquiring a user's input of touching at least one content among the plurality of contents or touching a sliding controller for expanding the flexible display, expanding the flexible display by a second length in response to acquiring the user's input, and displaying a second UI presenting a plurality of contents including more information than the plurality of contents, in a second region expanded by the second length.

The method further includes obtaining an external shock through the electronic device or the cover coupled to the electronic device, and expanding the flexible display by the first length in the first direction in response to obtaining the external shock. The external shock can include a double tap, or a tap having a predetermined pressure or more.

The method further includes obtaining an external obstacle by using at least one proximity sensor, presenting an obtaining notification in response to obtaining the external obstacle, and stopping the expansion of the flexible display or reducing the flexible display.

In accordance with an embodiment, an electronic device includes a flexible display, at least one rolling actuator for expanding or reducing the flexible display, and at least one processor electrically connected to the flexible display and the rolling actuator. The processor can acquire an expansion event for the flexible display. By driving the at least one rolling actuator in response to the expansion event, the processor can expand the flexible display by a first length in a first direction. A first UI presenting a plurality of content can be displayed in a first region expanded by the first length. The first UI can include a first content associated with the expansion event and a second content distinct from the first content.

The display expansion event can include at least one of receiving a message through wireless communication, inputting a button of the electronic device, attaching/detaching the electronic pen, inputting a button of the electronic pen, inputting a button of the wireless earphone, a knock signal for the electronic device, or a voice command.

The processor can determine a mounting state of the electronic device. The processor can determine a rolling actuator to be driven, among the at least one rolling actuator, based on the mounting state of the electronic device. The processor can drive the determined rolling actuator and expand the flexible display by a first length in an expansion direction of the determined rolling actuator.

The processor can output edge lighting at at least one edge of the flexible display in response to the expansion event.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a flexible display;
   a cover covering a first side of the electronic device, a second side of the electronic device on an opposite side of the electronic device to the first side, a third side of the electronic device perpendicular to the first side, and a fourth side of the electronic device on an opposite side of the electronic device to the third side;
   a plurality of rolling actuators for expanding and retracting the flexible display;
   a key configured to turn on/off the flexible display and disposed at the first side of the electronic device;
   a plurality of frame antennas including a first frame antenna positioned at the first side of the electronic device, a second frame antenna positioned at the first side of the electronic device, and a third frame antenna positioned at the first side of the electronic device, the second frame antenna being positioned between the first frame antenna and the third frame antenna;
   a plurality of capacitive sensors configured to detect an external object, and including a first capacitive sensor connected to the first frame antenna, a second capacitive sensor connected to the second frame antenna, and a third capacitive sensor connected to the third frame antenna;
   an optical sensor at least partially positioned at the second frame antenna, and configured to detect the external object;
   a wireless communication circuit; and
   a processor electrically connected to the flexible display, the rolling actuator, the optical sensor, and the wireless communication circuit;
   wherein the plurality of rolling actuators includes a first rolling actuator disposed parallel to the first side and facing the key, a second rolling actuator disposed parallel to the third side and perpendicular to the first rolling actuator, and a third rolling actuator disposed parallel to the fourth side and perpendicular to the first rolling actuator, the third rolling actuator being disposed opposite to the second rolling actuator,
   wherein the processor is configured to:
   receive, via the wireless communication circuit, a message from an external device,
   in response to receiving the message while the cover covers the flexible display, drive at least one of the first rolling actuator, the second rolling actuator or the third rolling actuator and expand the flexible display by a first length, and
   display, in a first region of the flexible display expanded by the first length, a first user interface (UI) including a first plurality of content,
   wherein the first plurality of content includes first content associated with the message and second content distinct from the first content, and
   wherein the processor is further configured to:
   expand the flexible display from under the cover in a first direction facing the fourth side toward the third side by the drive of the second rolling actuator disposed adjacent to the third side based on an open signal corresponding to an open state of the cover and a signal for a folding angle between the cover and the electronic device in case that the key is positioned at a right side when viewed the flexible display,
   expand the flexible display from under the cover in a second direction facing the third side toward the fourth side by the drive of the third rolling actuator disposed adjacent to the fourth side based on the open signal corresponding to the open state of the cover and the folding angle signal between the cover and the electronic device in case that the key is positioned at a left side when viewed the flexible display,
   detect the external object through at least one of the plurality of capacitive sensors or the optical sensor,
   determine a distance between the first side and the external object based on detecting the external object,
   in case that the distance between the first side and the external object is determined to be less than or equal to a maximum length to which the flexible display can extend, drive the first rolling actuator such that the first side is spaced apart from the external object by a specific distance less than the maximum length,
   in case that the distance between the first side and the external object is determined to be less than or equal to the specific distance, stop driving of the first rolling actuator,
   in case that the distance between the first side and the external object is determined to be greater than the maximum length, drive the first rolling actuator in response to receiving the message, and
   in case that an edge of the flexible display is under the cover, in response to receiving the message, expand the flexible display by a third length corresponding to a thickness of an edge lighting shorter than the first length to expose the edge lighting output at the edge of the flexible display.

2. The electronic device of claim 1, wherein the processor is further configured to:
   drive the first rolling actuator while the flexible display is expanded by the first length, and
   expand the flexible display by a second length in a first rightward direction.

3. The electronic device of claim 1, wherein the processor is further configured to:
   obtain a signal from a peripheral device connected to the electronic device, and
   in response to obtaining the signal of the peripheral device, display content related to the peripheral device through the first region of the flexible display.

4. The electronic device of claim 3, wherein the signal of the peripheral device comprises at least one of a signal related to an electronic pen, a signal related to a wireless earphone, a signal related to a home appliance, or a signal related to a vehicle.

5. The electronic device of claim 1, wherein the processor is further configured to:
acquire a user input of touching at least one of the first plurality of content or touching a sliding controller for expanding the flexible display,
in response to acquiring the user input, expand the flexible display by a second length, and
display a second UI including a second plurality of content including more information than the first plurality of content, in a second region expanded by the second length.

6. The electronic device of claim 1, wherein in response to obtaining an external shock through the electronic device or the cover, the processor is further configured to expand the flexible display by the first length in a first rightward direction, and
wherein the external shock includes a double tap or a tap having a predetermined pressure or more.

7. The electronic device of claim 1, wherein, in response to obtaining an external shock, the processor is further configured to:
acquire image data through a camera,
perform facial recognition, based on the acquired image data,
perform security authentication by comparing a recognized face with a face stored in the electronic device, and
output at least one of a warning message or a warning sound in response the recognized face not having a matching face stored in the electronic device.

8. The electronic device of claim 1, wherein the processor is further configured to:
divide a basic region of the flexible display and the first region expanded by the first length,
execute a first application through the basic region, and
execute a second application through the first region.

9. A method performed by an electronic device, the method comprising:
receiving a message from an external device,
in response to receiving the message while a cover covering a first side of the electronic device covers the flexible display, driving at least one of a first rolling actuator disposed parallel to the first side and facing a key disposed at the first side of the electronic device, a second rolling actuator disposed parallel to a third side of the electronic device perpendicular to the first side or a third rolling actuator disposed parallel to a fourth side of the electronic device opposite to the third side, and expanding a flexible display by a first length, the key being configured to turn on/off the flexible display, the second rolling actuator being disposed perpendicular to the first rolling actuator, and the third rolling actuator being disposed perpendicular to the first rolling actuator and opposite to the second rolling actuator,
displaying a first user interface (UI) including a first plurality of content, in a first region of the flexible display expanded by the first length,
expanding the flexible display from under the cover in a first direction facing the fourth side of the electronic device perpendicular to the first side toward a third side of the electronic device on an opposite side of the electronic device to the fourth side by the drive of the second rolling actuator disposed adjacent to the third side based on an open signal corresponding to an open state of the cover and a folding angle signal between the cover and the electronic device in case that the key is positioned at a right side when viewing the flexible display, and
expanding the flexible display from under the cover in a second direction facing the third side toward the fourth side by the drive of the third rolling actuator disposed adjacent to the fourth side based on the open signal corresponding to the open state of the cover and the folding angle signal between the cover and the electronic device in case that the key is positioned at a left side when viewing the flexible display,
detecting an external object through at least one of the plurality of capacitive sensors configured to detect an external object or the optical sensor at least partially positioned at the second frame antenna, and configured to detect the external object, the plurality of capacitive sensors including a first capacitive sensor connected to a first frame antenna positioned at the first side of the electronic device, a second capacitive sensor connected to a second frame antenna positioned at the first side of the electronic device, and a third capacitive sensor connected to a third frame antenna positioned at the first side of the electronic device,
determining a distance between the first side and the external object based on detecting the external object,
in case that the distance between the first side and the external object is determined to be less than or equal to a maximum length to which the flexible display can expand, driving the first rolling actuator such that the first side is spaced apart from the external object by a specific distance less than the maximum length,
in case that the distance between the first side and the external object is determined to be less than or equal to the specific distance, stopping driving of the first rolling actuator,
in case that the distance between the first side and the external object is determined to be greater than the maximum length, driving the first rolling actuator in response to receiving the message, and
in case that an edge of the flexible display is under the cover, in response to receiving the message, expanding the flexible display by a third length corresponding to a thickness of an edge lighting shorter than the first length to expose the edge lighting output at the edge of the flexible display,
wherein the second frame antenna is positioned between the first frame antenna and the third frame antenna, and
wherein the first plurality of content includes first content associated with the message and second content distinct from the first content.

10. The method of claim 9, further comprising:
obtaining a signal of a peripheral device connected to the electronic device; and
displaying content related to the peripheral device through the first region of the flexible display, in response to obtaining the signal of the peripheral device.

11. The method of claim 9, further comprising:
acquiring a user input of touching at least one of the first plurality of content or touching a sliding controller for expanding the flexible display;
in response to acquiring the user input, expanding the flexible display by a second length; and displaying a second UI including a second plurality of content including more information than the first plurality of content, in a second region expanded by the second length.

12. The method of claim 9, further comprising:

obtaining an external shock through the electronic device or the cover; and in response to obtaining the external shock, expanding the flexible display by the first length in a first rightward direction, wherein the external shock includes a double tap or a tap having a predetermined pressure or more.

* * * * *